(12) United States Patent
Ianakiev et al.

(10) Patent No.: US 7,078,705 B1
(45) Date of Patent: Jul. 18, 2006

(54) NEUTRON AND GAMMA DETECTOR USING AN IONIZATION CHAMBER WITH AN INTEGRATED BODY AND MODERATOR

(75) Inventors: Kiril D. Ianakiev, Los Alamos, NM (US); Martyn T. Swinhoe, Los Alamos, NM (US); John Paul Lestone, Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 282 days.

(21) Appl. No.: 10/677,040

(22) Filed: Sep. 30, 2003

(51) Int. Cl.
*G01T 3/00* (2006.01)
*G01T 1/185* (2006.01)
(52) U.S. Cl. .................. 250/390.01; 250/385.1
(58) Field of Classification Search ............ 250/385.1, 250/390.01
See application file for complete search history.

(56) References Cited

U.S. PATENT DOCUMENTS

| | | | |
|---|---|---|---|
| 2,968,726 A * | 1/1961 | Bersin et al. ............... | 376/155 |
| 3,654,469 A * | 4/1972 | Kantor ..................... | 250/385.1 |
| 4,543,483 A * | 9/1985 | Genrich ...................... | 250/374 |
| 6,426,504 B1 * | 7/2002 | Menlove et al. ....... | 250/390.01 |
| 2004/0262530 A1 * | 12/2004 | Reber et al. ................ | 250/395 |

FOREIGN PATENT DOCUMENTS

GB  1183718  *  3/1970

* cited by examiner

*Primary Examiner*—Constantine Hannaher
(74) *Attorney, Agent, or Firm*—John P. O'Banion

(57) ABSTRACT

A detector for detecting neutrons and gamma radiation includes a cathode that defines an interior surface and an interior volume. A conductive neutron-capturing layer is disposed on the interior surface of the cathode and a plastic housing surrounds the cathode. A plastic lid is attached to the housing and encloses the interior volume of the cathode forming an ionization chamber, into the center of which an anode extends from the plastic lid. A working gas is disposed within the ionization chamber and a high biasing voltage is connected to the cathode. Processing electronics are coupled to the anode and process current pulses which are converted into Gaussian pulses, which are either counted as neutrons or integrated as gammas, in response to whether pulse amplitude crosses a neutron threshold. The detector according to the invention may be readily fabricated into single or multilayer detector arrays.

64 Claims, 12 Drawing Sheets

NEUTRON AND GAMMA DETECTOR USING AN IONIZATION CHAMBER WITH AN INTEGRATED BODY AND MODERATOR

STATEMENT REGARDING FEDERALLY SPONSORED RESEARCH OR DEVELOPMENT

This invention was made with Government support under Contract No. W-7405-ENG-36, awarded by the Department of Energy. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

Not Applicable

BACKGROUND OF THE INVENTION

1. Field of the Invention

This invention pertains generally to devices for detecting radiation, and more particularly to devices for detecting neutrons and gross gamma radiation.

2. Description of Related Art

Neutron and gamma radiation detectors are important devices for providing large area radiation monitoring, such as in the homeland defense initiative. These detectors can be used, for example, as linear sensor arrays along highways or railways, as rings of detectors surrounding critical nuclear, military, or government facilities, or as individual networked detectors for cargo ships, harbor cranes, or luggage screening systems. In addition to the area of homeland security, neutron and gamma detectors can also be used in the "traditional" neutron applications of nuclear safeguards and waste measurements.

Various types and configurations of neutron and gamma detectors have been previously developed. For example, detectors, or proportional counters, lined with helium-3 (3He), boron triflouride (BF3) and boron-10 (10B) are a very mature and stable technology. However, they can be extremely expensive due to complex manufacturing processes and high material costs. Similarly, 6Li glass fiber or 10B doped scintillation detectors are also extremely expensive, and moreover, they can exhibit significant temperature and high voltage dependencies. Furthermore, these detectors typically rely on complicated gamma/neutron separation techniques. In general, scintillator based neutron detectors are unable to achieve high levels of geometric efficiency at moderate cost levels.

Classical 3He proportional counters rely on gas multiplication gain to perform detection. These detectors are generally configured in a cylindrical geometry that in some cases may utilize the moderating material as the structural support to reduce overall weight. It should be recognized that the use of proportional counters, because of the inherent gas multiplication process, require orders of magnitude higher gas purity than ionization chambers. However, the working gas in such units is permanently sealed within the detection volume and subject to the build-up of impurities. A thin sense wire within the detection device passes through the cylinder and functions as a collecting electrode. The collecting electrode is connected to a high voltage bias source requiring that the connected sense components be able to resist these high voltages, while the high voltage is disadvantageously exposed to the surrounding environment. Signals at the collecting electrode are also directly subject to noise from the high voltage power supply. Furthermore, the collecting electrode is difficult to mount, induces additional detector capacitance and is susceptible to acoustic noise and vibration, wherein the proportional counter must rely on significant gas multiplication effects to provide sufficient signal-to-noise margins.

Therefore, there is a need for an apparatus for the detection of neutrons and gross gamma radiation that recognizes the present drawbacks and provides a solution to one or more of the problems associated therewith. The present invention satisfies that need, as well as others, and overcomes deficiencies in previously developed detection devices.

BRIEF SUMMARY OF THE INVENTION

The present invention is an apparatus for the detection of neutrons and gross gamma radiation, wherein the energy of the interactions of neutrons or gamma particles with the material within the detector are converted into electrical pulses that can be counted and used as a quantitative measure of the incoming radiation. In one mode, the present invention can be used for the detection of plutonium nuclear devices or radiation dispersal devices (e.g., "dirty bombs") at key locations such as ports of entry or border crossings. In another mode, the present invention can also be used for the measurement of radioactive waste.

In one embodiment of the invention, an apparatus for detecting neutrons and gamma radiation includes a cathode that defines an interior surface and an interior volume. A plastic housing surrounds the cathode and a plastic lid is welded or otherwise attached to the housing. The lid encloses the interior volume of the cathode. An anode extends from the lid into the interior volume of the cathode and a working gas is disposed within the interior volume of the cathode. Further, a conductive neutron-capturing layer is disposed on the interior surface of the cathode.

In a preferred embodiment, the plastic housing and the plastic lid are made from high density polyethylene (HDPE). The working gas within the chamber volume is preferably argon or xenon, or other gas mixture exhibiting a high stopping power for charged particles. ("High" stopping power is herein considered in relation to other gas mixtures that could be selected.) Preferably, the conductive neutron-capturing layer is chosen from the group including the following: lithium-6 (6Li), boron-10 (10B), gadolinium (Gd), a lithium-6 compound, a boron-10 compound, a gadolinium compound, and/or combinations thereof. In a preferred embodiment, the detector also includes an electrostatic shield layer that covers the housing and the lid, which is preferably welded to the housing.

Preferably, in this embodiment of the invention, the anode is affixed to a hermetically sealed feed-through insulator that extends from the lid into the interior volume. The anode is disposed near the center of the interior volume. In a preferred embodiment, a high voltage bias source is electrically connected to the cathode and processing electronics are electrically connected to the anode. Preferably, the processing electronics includes logic for separating neutron pulses from gamma pulses.

Another embodiment of the invention describes a detector comprising an array of cathodes for detecting neutrons and gamma radiation. In one embodiment, half of the cathodes are upward facing and half of the cathodes are downward facing. Each cathode defines an interior surface and an interior volume. A plastic housing surrounds the cathodes. A plastic top cover is attached to the housing and encloses the interior volumes of the upward facing cathodes and a plastic bottom cover is attached to the housing opposite the top cover. The bottom cover encloses the interior volumes of the downward facing cathodes. Plural anodes extend from the top cover and the bottom cover such that each anode extends into the interior volume of each cathode. Additionally, a working gas is disposed within the interior volume of each cathode and a conductive neutron-capturing layer is disposed on the interior surface of each cathode. The proposed detectors can be configured as individual slabs, linear arrays, three-dimensional structures, arcs, tunnels, and so forth thereby providing extensive installation flexibility.

The present invention also describes a method for detecting neutrons and gamma radiation. In one embodiment, the method includes providing a cathode, such as within a plastic housing, that has an interior surface and an interior volume. A conductive neutron-capturing layer is provided on the interior surface of the cathode, which is coupled to a high voltage bias source. An anode is provided that extends into the interior volume of the cathode which is filled with a working gas. Processing electronics are electrically connected to the anode providing a means for separating neutron pulses from gamma pulses.

The present invention has a number of advantages over previous detector designs. The detector is an ionization chamber operating in pulse mode for the neutrons and DC mode for gammas. Numerous benefits are derived by eliminating the reliance on gas multiplication gain. (a) Detector operation is less impacted by gas impurities thereby allowing the use of materials and construction that were not suited for proportional counters. (b) The counting characteristics of the detector is substantially flat across a wide range of bias voltages. (c) A collecting electrode can be implemented which is less susceptible to vibrations and acoustic noise, such as utilizing a sphere electrode for spherical or quasi-spherical chambers or a hollow rod for a cylindrical chamber, which in either case is mounted to one or more sturdy structural supports. (d) A feedthrough may be readily implemented to insulate the collection electrode from the chamber.

The cylindrical geometry of prior chambers, which comprised numerous parts and complex assembly, are preferably replaced with a quasi-spherical to quasi-cubical geometry in the present invention having a lid closure assembly. The collecting electrode can be pre-attached to the lid prior to attachment to seal the chamber. The construction of the present invention allows easy and cost effective scaling of the detector to a 3D structure of cells. By way of example a honeycomb of chambers can be created in a desired shape, such as a single planar array of detectors, two planar arrays of detectors arranged back-to-back, or other two or three-dimensional geometries.

The alternated layers of moderator and Li6 foil, or similar, within the present invention provides better coupling between the moderation and capturing processes which improves total efficiency.

The high bias voltage is applied to the cathode and the 6Li foil within the interior of the detector and as a result the high voltage (HV) circuitry is not exposed to the atmosphere. The voltage output of the HV circuit is implemented to provide sufficient field strength for the given detector, typically this output voltage will be between 250V to 3000V, although voltages above or below these levels may be utilized for some applications. All high voltage circuitry, including electrodes, filter and HV bias can be readily sealed within the plastic enclosure. For example high voltage elements are preferably embedded within the plastic moderator which also serves in this scenario as electrical insulation. Processing electronics can be implemented at lower cost because the signal collecting electrode is not subject to high voltage bias, and is also not subject to AC noise directly coupled to the detector from the power supply.

Each chamber (cell) of a detector array is configured with a substantially cubical shape with a size equal to or less than the range of the tritons in the selected gas mixture. The cubical shape provides a larger surface area per unit volume than a spherical or cylindrical shape. More sophisticated shapes and surfaces may also be utilized within the present invention to further increase the efficiency per unit volume. For example, the use of shortened cubes provides high efficiency, along with high packaging density.

The metalized and laminated (i.e. 6Li foil) internal surface of each cell is biased with negative voltage in order to achieve a desired electrical field. The high-reactivity of the Li metal to the electronegative gases and their compounds like $O_2$, Cl, F, and so forth act as a getter to help keep the gas clean.

The generally spherical geometry of the collecting electrode (i.e. anode) provides a high ratio of emitting electrode surface to the collecting electrode capacitance, which boosts efficiency and minimizes the noise. The collecting electrode is connected to the virtual ground of the preamplifier within the processing electronics. The spherical collecting electrode geometry is also generally easier to assemble, as it can be preassembled with a lid before lamination with the 6Li. Therefore the remaining assembly process after lamination is straight-forward with the lid(s) being aligned to the plastic body and hermetically sealing the metal liners.

The present invention provides a number of beneficial aspects including but not limited to the following.

An aspect of the invention is a radiation detector that is implemented as an ionization chamber which does not rely on the gain of gas multiplication.

Another aspect of the invention is configuring the ionization chamber as a quasi-spherical to quasi-cubical geometry.

Another aspect of the invention is configuring the ionization chamber in a shortened quasi-cubical geometry.

Another aspect of the invention is the formation of an array of ionization chambers to increase detector sensitivity.

Another aspect of the invention is lining the interior of the ionization chamber with a highly reactive material, such as Lithium metal, which is capable of acting as a getter material to remove electronegative gases and their compounds such as oxygen, chlorine, fluorine, and so forth, thereby keeping the ionization gas clean.

Another aspect of the invention is elimination of suspended wire collecting electrodes which are subject to vibration and acoustical noise along with other drawbacks.

Another aspect of the invention is the utilization of solid collecting electrodes, such as quasi-spherical, which are matched to the shape of the ionization chamber.

Another aspect of the invention is the utilization of a sturdy collecting electrode structure which protrudes into the ionization chamber and is resistant to vibration and acoustic disturbances.

Another aspect of the invention is the use of alternating layers of moderator and Li6 foil to provide improved coupling between the moderation and capturing processes to increase efficiency.

Another aspect of the invention is configuring the cell with a lid which can be preassembled with a collecting electrode(s), prior to alignment and assembly on an ionization chamber(s).

A still further aspect of the invention is a detection counting process that converts detected current pulses to Gaussian pulses, and which counts those pulses above a predetermined amplitude threshold while integrating those pulses below the given threshold.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and logic steps generally shown in FIG. 1 through FIG. 13. It will be appreciated that the apparatus may vary as to configuration and as to details of the parts, and that the method may vary as to the specific steps and sequence, without departing from the basic concepts as disclosed herein.

Figure 1:
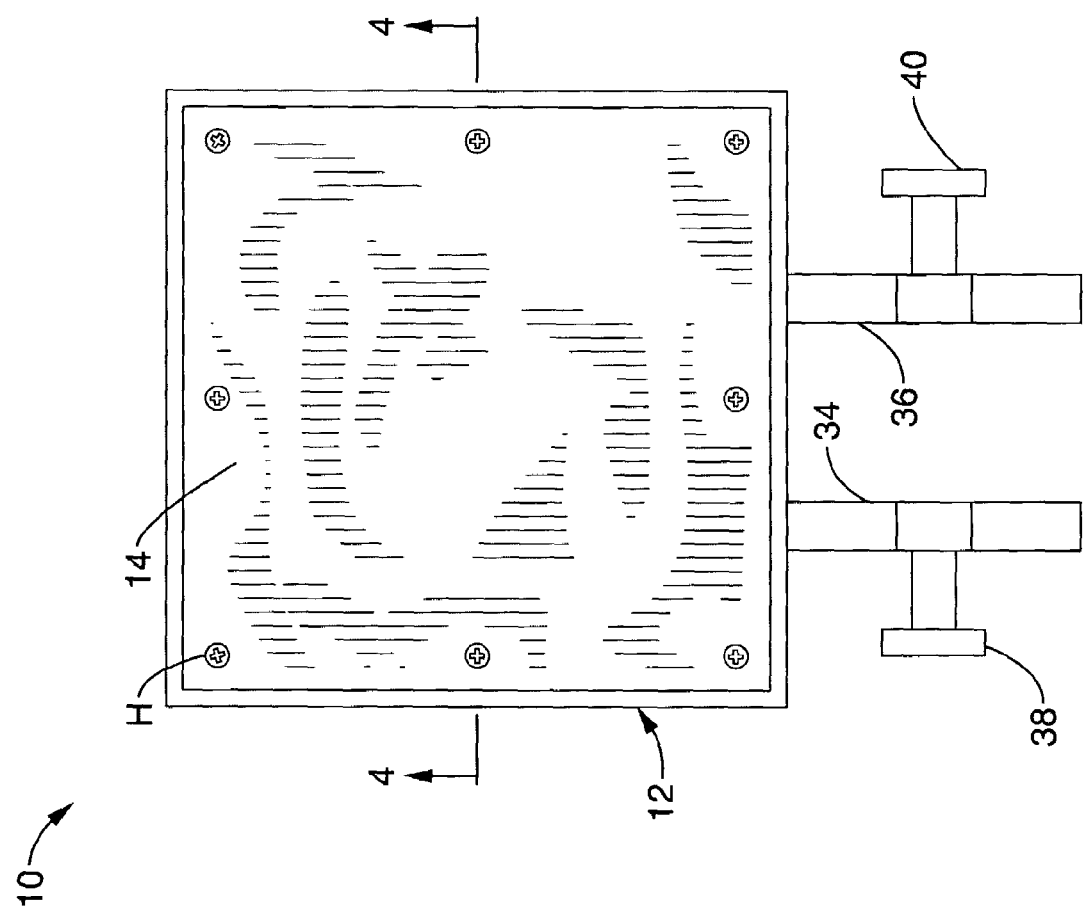
FIG. 1 is a top plan assembled view of a single cell embodiment of a neutron and gamma detector according to the present invention.
Figure 2:
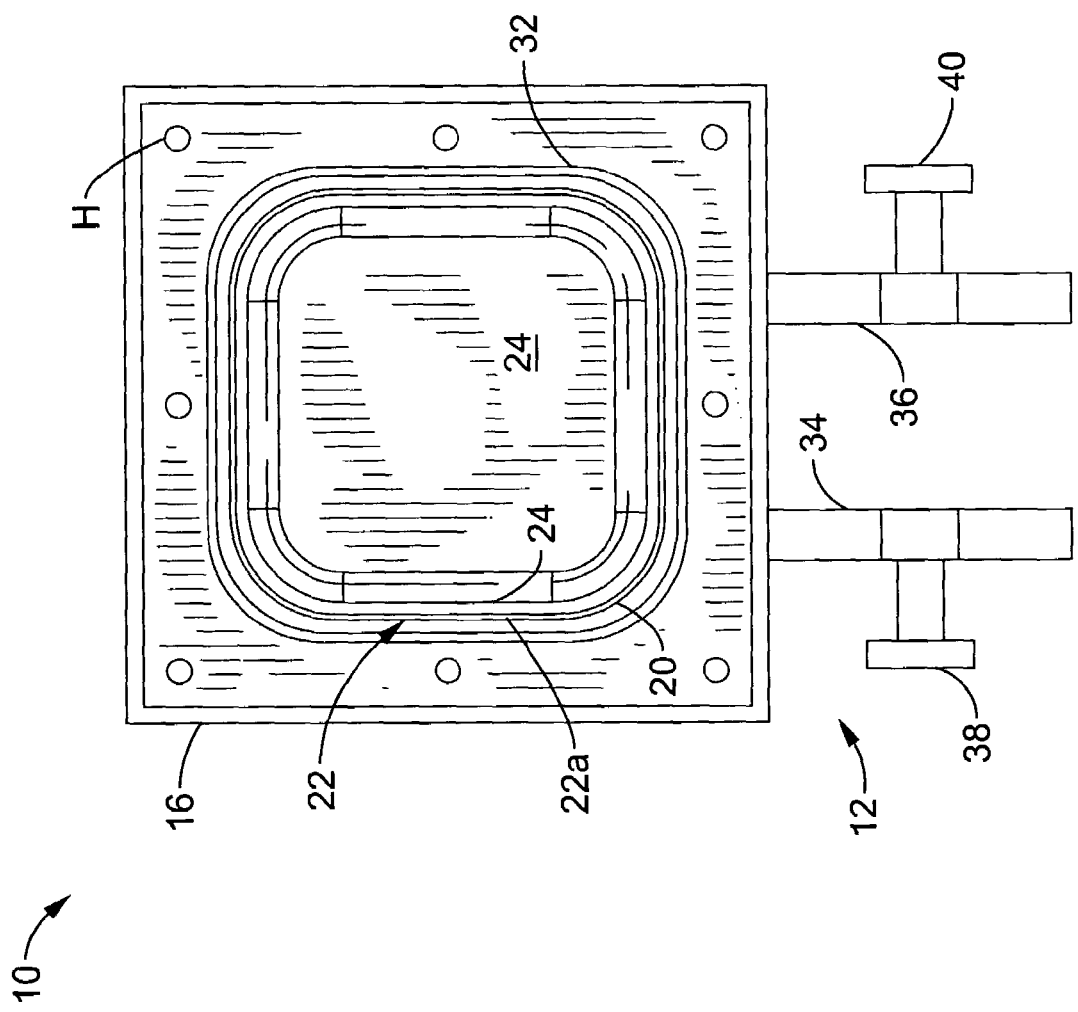
FIG. 2 is a top plan view of the neutron and gamma detector of FIG. 1 with the lid portion removed.
Figure 3:
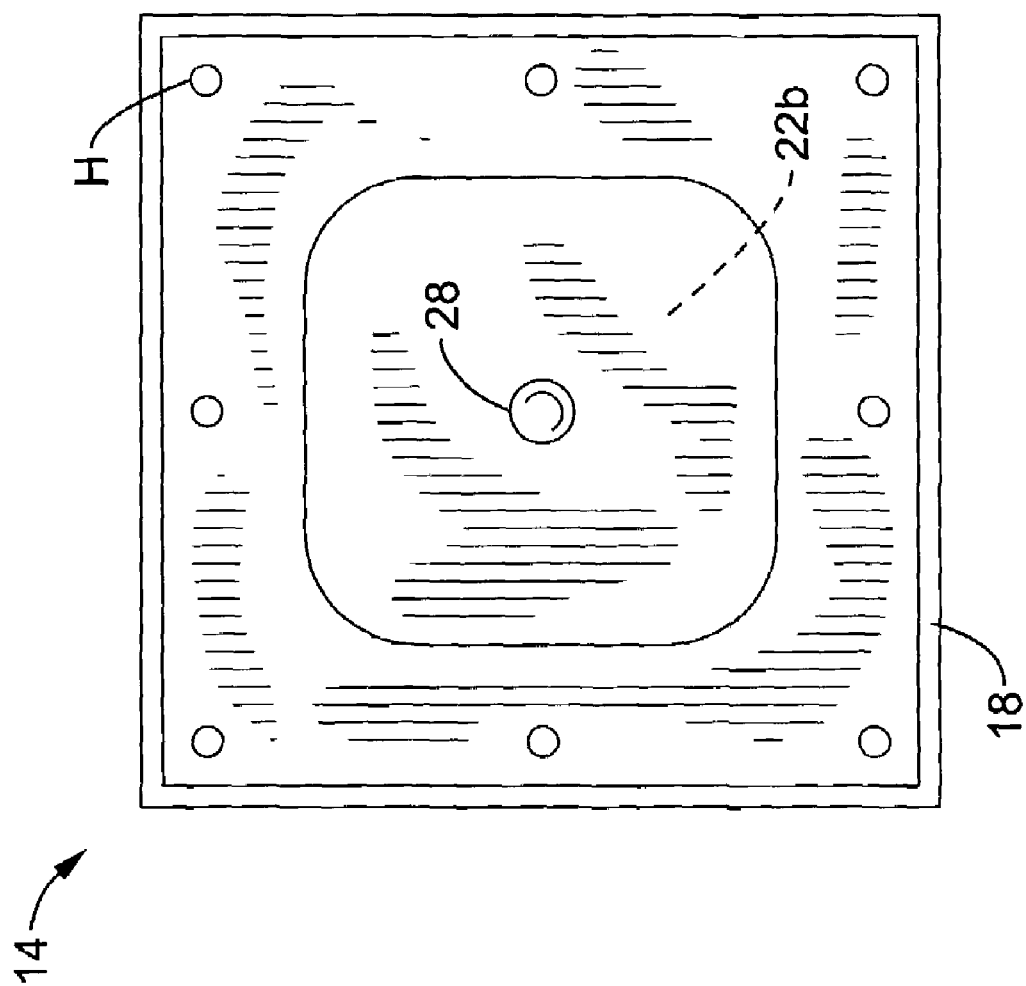
FIG. 3 is a plan view of the underside of the lid portion of the neutron and gamma detector of FIG. 1.
Figure 4:
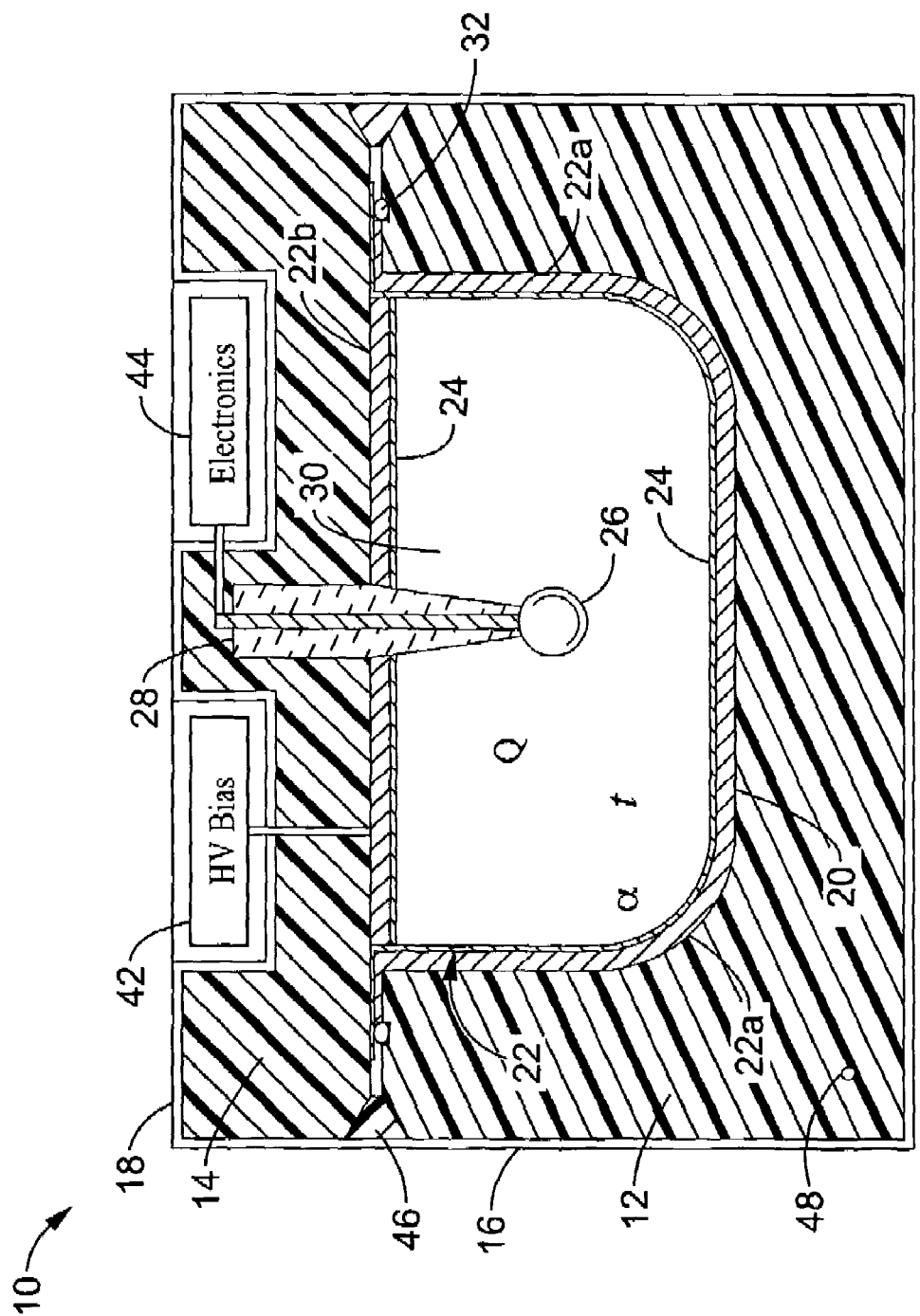
FIG. 4 is a cross-section view of the neutron and gamma detector of FIG. 1 taken along line 4—4.

Referring initially to FIG. 1 through FIG. 4, a single cell embodiment of a neutron and gamma radiation detector according to an embodiment of the invention is shown and is generally designated 10. FIG. 1 depicts the exterior of the detector, FIG. 2 depicts the interior of the detector with the lid removed, FIG. 3 depicts the underside of the lid, and FIG. 4 depicts a cross-section of the detector with the lid attached.

As shown, radiation detector 10 is an ionization chamber that includes a generally square, box shaped housing 12 having a generally square lid 14. It is to be understood that, in a preferred embodiment, housing 12 and lid 14 are fabricated from plastic, such as high-density polyethylene (HDPE), or other material that beneficially reduces gamma and neutron velocity. It can further be understood that housing 12 and lid 14 can comprise HDPE, polyethylene, paraffin and any other hydrocarbons having a sufficient hydrogen content. The thickness of the HDPE body is determined by the energy of the incident neutrons and usually it is optimized by calculations in radiation transport code such as MCNP. Moreover, as shown, housing 12 and lid 14 can each be covered by an electrostatic shield layer 16, 18. It is to be understood that the HDPE material comprising housing 12 and lid 14 serves as a neutron moderator to reduce the speed of fast energy neutrons down into the thermal energy region where they can interact with a capture material, described below. The HDPE material also serves as electrical insulation.

FIG. 1 through FIG. 4 further shows that housing 12 is formed with a generally cup-shaped depression 20. More specifically, the cup-shaped depression has a generally flat bottom and four flat sides. Each side is preferably connected to an adjacent side by a rounded corner, and each side is preferably connected to the bottom by a rounded corner. This depression contains a generally cup-shaped cathode portion 22a that mates with a planar-shaped cathode portion 22b on lid 14 which encloses the chamber forming cathode 22. The surfaces of the cathode portions 22a and 22b are covered with a conductive neutron-capturing layer 24, which is a layer of a material with high capture cross-section for thermal neutrons such as lithium-6 (6Li), boron-10 (10B), gadolinium (Gd), or compounds of each. It is to be understood that the high reactivity of the 6Li keeps a working gas within cathode 22 free of oxygen and the compounds thereof, such as $H_2O$, $CO_2$, and other gases that can capture the free electrons and create electronegative ions. It is known that Li metal has high chemical reactivity, wherein it readily combines with oxygen and other compounds and removes them from the gas, thereby keeping it clean.

As shown, an anode 26 is attached to a hermetically sealed feed-through insulator 28 that extends from lid 14 into the interior area of cathode 22. Preferably, anode 26 is located near the center of the interior of cathode 22. In a preferred embodiment, interior of cathode 22 is filled with a working gas 30 such as argon, xenon, or other gas mixtures having high relative stopping power for gammas and neutrons. Preferably, the working gas 30 has a pressure of one atmosphere to eliminate the necessity of high pressure containment, alternatively working gas above one atmosphere can be retained. An "O"-ring gasket 32 is installed between housing 12 and lid 14 in order to effectively seal the interior of cathode 22.

It is to be understood that the optimum geometry of cathode 22 is quasi-spherical; that is, the cup-shaped depressions 20 with rounded corners provide increased cathode surface area and reduced anode capacitance. As such, efficiency and signal-to-noise ratio are optimized.

The dimensions of the cells are preferably determined in response to the stopping power of the working gas and as a tradeoff between the energy deposited in the working gas and the surface per unit volume. A preferred shape for the cells as a half-cube is selected largely based on the following considerations: (1) the single cubical/rectangular shape has more surface area per a given volume than a single cylinder or sphere having the same volume; (2) shortening the height of the cell (from a full cube shape) allows maintaining an efficient spectrum shape that allows using a shorter anode which provides lower capacitance and less induced vibration error, and allows installing a second layer of cells in only slightly more volume than would be required for a single layer of fully cubical or spherical cells.

Considering the selection of a spherical cathode chamber shape, the tip of the anode can be configured having a radius chosen to give sufficient distance to stop the charged particles in the working gas thereby providing an optimal shape for charge collection. However, it should be recognized that a rectangular cathode chamber provides increased surface area for a given volume with only a slightly less optimal shape for charge collection. In practice, this charge collection is sufficient, wherein the cell geometry can be modified for other reasons, such as vibrational stability, density of cells within an array, and so forth.

The shortened cubical shape described has been found to provide flat counting characteristic (depicted in FIG. 8), wherein charge collection is not affected even if the field intensity changes several times. It has been found in practice that shortening the cell height in this manner leads to improved cell efficiency and vibration stability. Embodiments may be created for the present invention with cells having further height reductions than those depicted.

Other cell shapes may also be utilized within the detector, such as hexagonal, and so forth, insofar as they provide suitable surface area per unit volume ratio and acceptable charge deposit and charge collection. The preferable radius of the depression (cell depth along the anode axis), depends on the stopping power of the gas and should be selected in such a way that the deposited energy is a substantial fraction of the charged particle energy. It should be appreciated that the surfaces of cells may also be configured to incorporate recesses and protrusions toward increasing collection efficiency, without departing from the teachings of the present invention.

FIG. 1 and FIG. 2 show an input line 34 and an output line 36 in fluid communication with the interior of cathode 22. Additionally, input line 34 includes an input valve 38 and output line 36 includes an output valve 40. The valves allow introduction of working gas 30 to the interior of cathode 22. It should be appreciated, however, that in most applications the chambers would be filled with working gas 30 which would be permanently retained within the detector. Consequently, there is typically no need of adjustable valves 38, 40, and one or more sealable tube structures would preferably replace input line 34 and output line 36, such as using a pinch tube mechanism.

FIG. 4 shows that cathode 22a is connected to a high voltage bias source 42 with negative polarity (applied via a connection through housing 12). It is preferable that the high voltage (HV) bias circuitry be potted with insulating material wherein high voltages are not exposed on the exterior of the unit. The HV bias circuit can be connected to cathode 22a through a pinch-tube which can serve as an electrical connection while providing for fluid communication with the cell until the cell is filled with working gas and the pinch-tube is pinched off thereby sealing the gas within. It should be noted that the underside portion of lid 14 preferably has the same metal liner and 6Li foil lining as that which lines the interior of cathode portion 22a. The lining 22b on lid 14 extends sufficiently to make contact with cathode 22a but does not extend to the edges of the lid, as this would make the HV bias accessible from the exterior of the unit.

Anode 26 is connected through feed-through insulator 28 to the input of signal processing electronics 44, described in detail below, which acts as a virtual ground. Lid 14 may be sealed and joined to housing 12 by any convenient means, for example using a plastic weld 46, in addition to, or as an alternative to, a plurality of fasteners (not shown) inserted through holes H.

It is to be understood that the geometry of cathode 22 and the field intensity can be selected to minimize recombination between electrons and ions near the surface of the emitting electrode. Generally, the electrical field intensity in the chamber should be within these boundary values: (1) a minimum intensity sufficient to saturate the electrons drift velocity, (2) a maximum field intensity maintained below the gas multiplication threshold.

The configuration of the electrical field is determined by the shape of the cathode surface, size of the anode sphere and applied high voltage. Increasing the diameter of the anode reduces the difference between the maximum electric field (at the anode surface) and the minimum electric field (at the cathode), which leads to better charge collection.

The optimal size/shape of the detection cell should (1) fulfill the above requirements for electrical field intensity, (2) ensure sufficient energy deposition by the emitted particles, and (3) provide a high ratio of emitting surface per unit volume. In addition, the stopping power of the gas should be taken into account because energy deposition depends on it.

During operation, incident neutrons (e.g., neutron 48) can be thermalized in the HDPE housing 12 and captured by the active material in capturing layer 24. Charged particles, e.g., alpha particles ($\alpha$) and triton particles (t) in the case of a Lithium-6 layer escape from the active layer as a result from the nuclear reaction, and deposit their energy in the working gas. This process can create electron-ion pairs. The electrons move in the direction of the applied electric field (from cathode 22 to anode 26) and can be collected by anode 26. Further, the charge Q arriving at anode 26 can be converted to an electrical pulse by processing electronics 44. It is to be understood that the gamma quanta can produce electrical charge by the way of the reaction with material adjacent to the gas volume. The charge is collected and gives rise to pulses, as described above.

Figure 5:
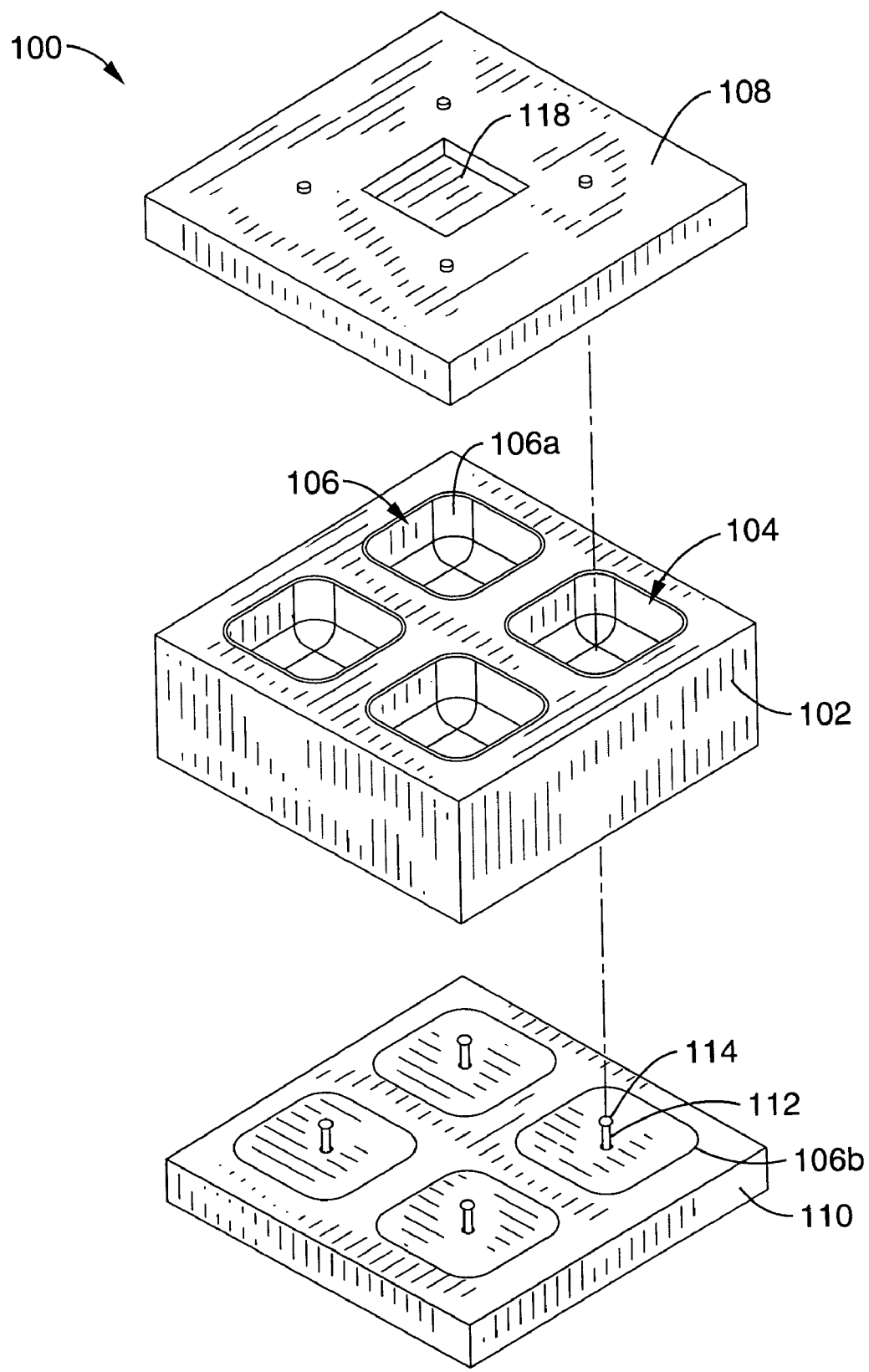
FIG. 5 is an exploded view of a neutron and gamma detector according to the present invention having a 2×4 array of detector cells.
Figure 6:
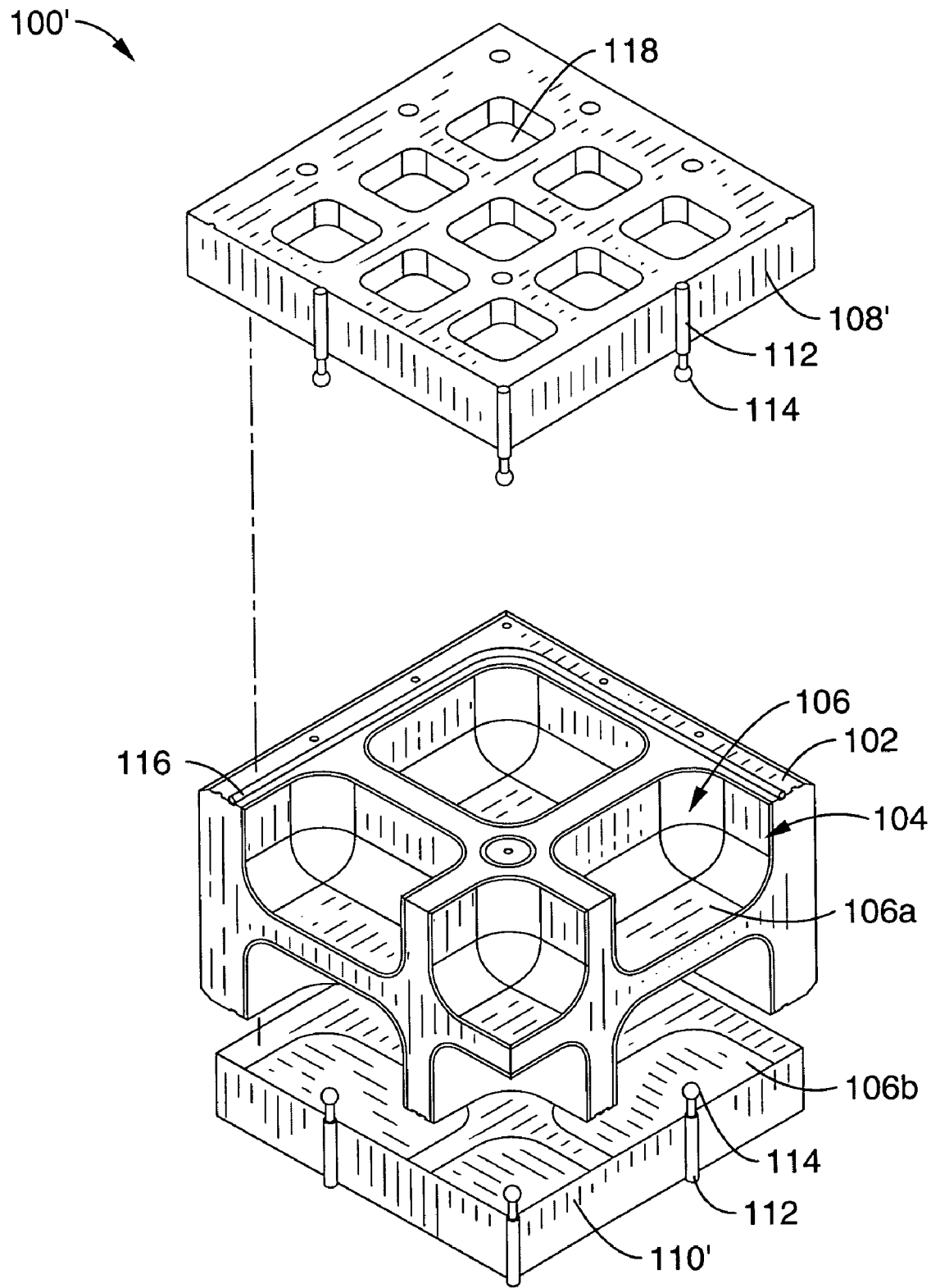
FIG. 6 is an exploded view of a neutron and gamma detector according to the present invention having a 2×9 array of detector cells and showing upper and lower chambers, a portion of which are cut away for clarity.

Referring now to FIG. 5 and FIG. 6, two non-limiting, exemplary embodiments of neutron and gamma radiation detector cells are shown as examples of multi-cell detectors, and are generally designated 100 and 100', respectively. The embodiment of FIG. 5 is a 2×4 configuration while the embodiment in FIG. 6 is a 2×9 configuration. As shown, both embodiments include a central housing 102 in which cup-shaped depressions 104 are formed. A cathode 106 is installed in each depression 104 with metalization portions 106*a* (including a conductive neutron-capturing layer) that is configured to make connection with metalization portions 106*b* on the interior surface of lid 108, 108', 110, 110'. In FIG. 5, the depressions 104 are preferably symmetrically arranged such that two layers of four depressions each are established (four on each side of central housing 102), and four cathode openings face outward in one direction and four cathode openings face in the opposite direction, (i.e., one hundred and eighty degrees from the first four cathodes). In the embodiment shown in FIG. 5, four cathode openings face in a generally downward direction and four cathode openings face in a generally upward direction. In FIG. 6, the depressions 104 are preferably symmetrically arranged such that two layers of nine depressions each are established (nine on each side of central housing 102), and as shown, nine cathodes openings face in one direction and nine openings face in the opposite direction. It will be appreciated that implementation is not limited to the number or arrangement of ionization chambers shown, whereby one of ordinary skill can modify these embodiments without departing from the teachings of the present invention.

The configurations shown in FIG. 5 and FIG. 6 were chosen because they provide a number of benefits including the following. (1) They provide efficiency similar to optimally spaced 3He tubes yet are more easily manufactured with the entire detector consisting of three parts. Simple fast construction is an important benefit, especially in view of the need to assemble the unit in a costly dry room facility because of the preferred use of lithium metal laminations. (2) The processing electronics can be coupled directly on the detectors, such as on the outside surfaces of the lids hidden in depressions 118. Aside from their use in retaining the electronics, the depressions can serve as (i) input windows for low energy neutrons, (ii) cutouts about which ribs are formed to promote structural stability, and so forth.

As shown in FIG. 5 and FIG. 6, detector arrays 100, 100' include top covers 108, 108' respectively, and bottom covers 110, 110' that can be used to seal the interior volumes established within depressions 104 covered by metalization portions 106*a* of cathodes 106. The interior portions of the lids which cover the openings over each cathode 106 is preferably lined with the same metal liner 106*b* and 6Li foil as cathode portion 106*a*. A plurality of hermetically sealed feed-through insulators 112 extend through the top and bottom covers 108, 108', 110, 110'; that is, one feed-through insulator 112 extends into the interior of each cathode 106. Moreover, an anode 114 is attached to the end of each feed-through insulator 112 within the interior of each cathode 106. FIG. 5 and FIG. 6 also illustrate a channel 116 with an "O"-ring gasket installed between each cover and the central housing. Although the wire connection to the anode is shown perpendicular to the plane of the lid, it will be appreciated that the anode connecting wire may subtend any desired angle through the lid. Angling the connecting wire can provide manufacturing or signal benefits, such as to reduce the path length from the anode to input of the preamplifier, for instance when clustering a series of cells about a single signal processing circuit receiving multiple inputs.

From FIG. 5 and FIG. 6 a difference in the configuration of the covers 108, 108' can be seen. In FIG. 5, cover 108 has a central receptacle 118 for placement of the electronics which connects HV bias to each cathode and processing electronics to each anode. In FIG. 6, cover 108' has a plurality of receptacles 118, one corresponding to each of the cathodes for placement of the electronics, wherein separate electronic modules may be connected for each cell. It should be recognized that the pulses and DC signals from each cell and cluster of cells as processed by the processing electronics are preferably consolidated within two outputs (gamma and neutron) for the detector device.

It is to be understood that the central housing and the covers are preferably made from HDPE. Additionally, the cathodes can share a common gas source, a common high voltage bias source, and a common processing circuit in order to reduce costs associated with manufacturing and operating the detector array. Furthermore, the detector array can be covered by an electrostatic shield layer, similar to the embodiment shown in FIG. 1 through FIG. 4.

It can be appreciated that, depending on the intended application, the array can take a generally linear shape, a circular shape, a semi-circular shape, and so forth. Furthermore, it will be appreciated that the array operates in the same manner described above in conjunction with the description of detector 10 shown in FIG. 1 through FIG. 4. However, detection efficiency improvements can be obtained by increasing the number of cathodes as shown in FIG. 5 and FIG. 6, and it will be appreciated that fewer or larger number of cathodes than shown in those figures can be utilized. Moreover, efficient coupling between the moderator material, (i.e. the HDPE), and the active material (i.e., the 6Li), minimizes the parasitic neutron absorption in the moderator material and improves the efficiency of the arrays 100, 100'.

Figure 7:
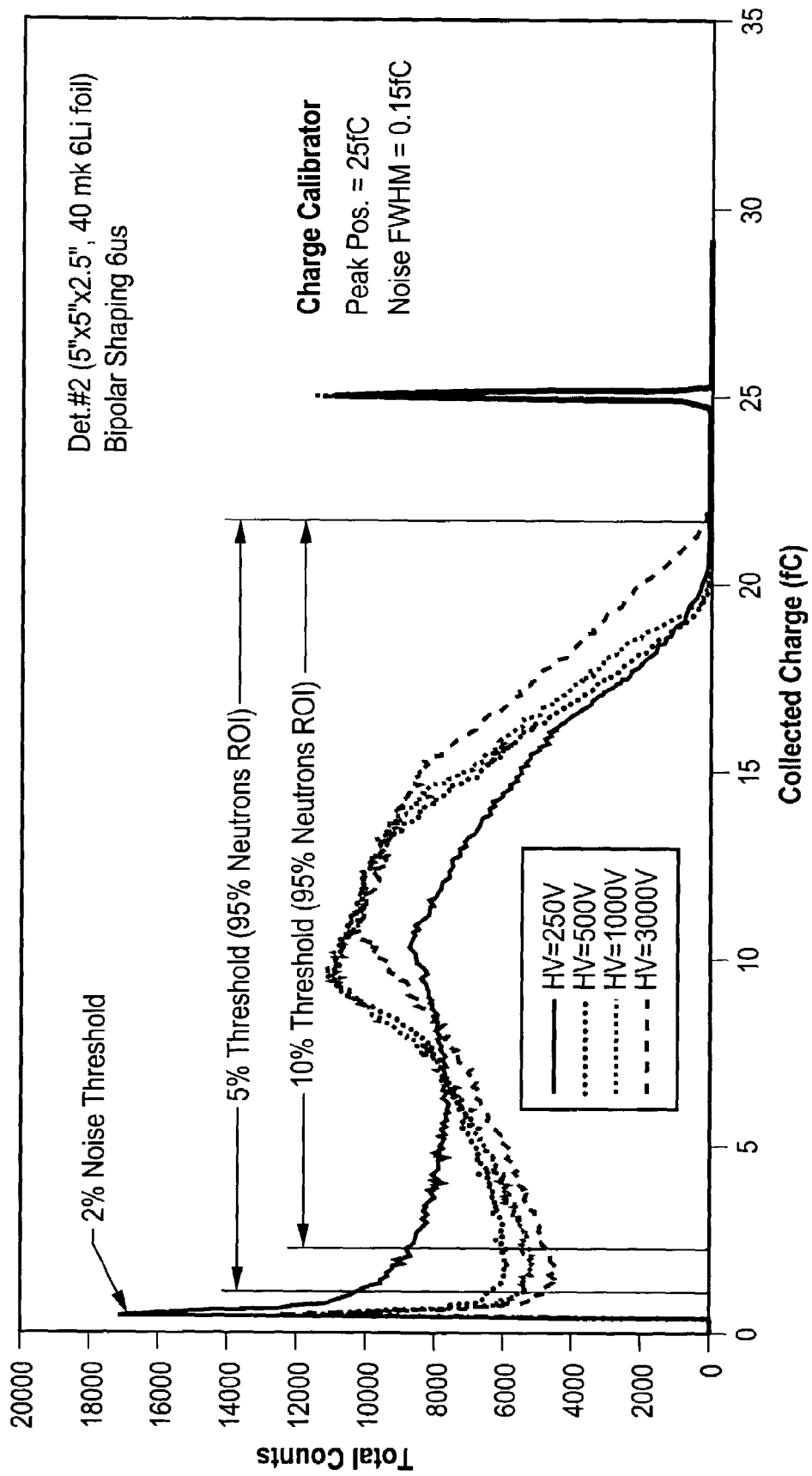
FIG. 7 is a graph showing the pulse height spectrum for a neutron and gamma detector according to the present invention.

Referring now to FIG. 7, a graph representing the pulse height spectrum for a detector is shown. It is to be understood that the graph illustrates data generated experimentally for a five inch by five inch by two and one-half inch (5"×5"×2.5") detector. Specifically, the graph shows the pulse height spectrum for neutrons from Californium-252 (Cf-252) radiation incident on the above-described detector. As shown, the detector shows dual neutron/gamma sensitivity. When only gamma radiation is incident on the detector, the pulse height spectrum extends up to about ten percent (10%) of the maximum of that for neutron radiation. The noise threshold is about one percent of the maximum pulse height distribution for neutron radiation.

Significant conclusions can be drawn from the experimental data of FIG. 7, including the following. (1) Neutron pulse height spectrum is separated from the gamma spectrum, therefore a threshold above 10% of maximum pulse height distribution should thereby separate the neutrons from the gammas. The neutrons left below the threshold are less that 10% of the total neutrons. (2) The shape of the pulse height spectrum does not substantially depend on the HV bias voltage. This gives rise to two advantages: (i) the detector is not as sensitive to HV variations as a proportional counter; and (ii) the shape of the detection cell can be varied significantly to improve emitting surface and manufacturability while retaining efficient collection characteristics.

Figure 8:
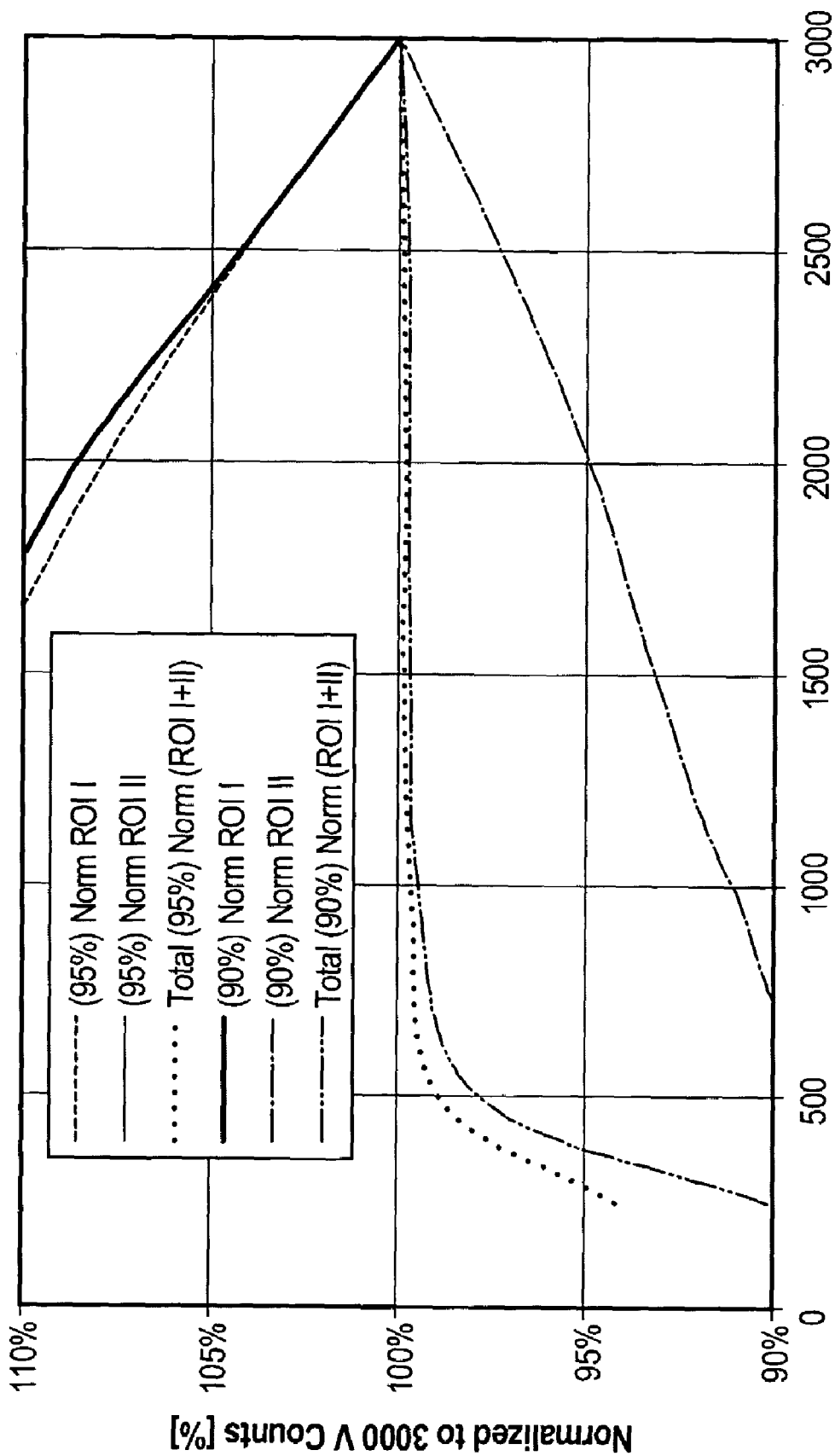
FIG. 8 is a graph showing the normalized counting characteristic versus high voltage bias voltage for a neutron and gamma detector according to the present invention.

FIG. 8 is a graph showing normalized counting characteristics plotted versus a high voltage bias voltage. Specifically, FIG. 8 shows the counting characteristics for two thresholds corresponding to ninety percent (90%) of the region of interest (ROI) and ninety-five percent (95%) ROI, shown in FIG. 7, versus HV bias, wherein a plateau characteristic is shown. As shown in FIG. 8, the total count rate is effectively independent of HV bias above one thousand volts (1000V). Moreover, as shown in FIG. 8, the gain within the detector is not sensitive to HV over a very wide range. As such, almost one hundred percent (100%) charge collection efficiency is indicated. It is to be understood that neutron efficiency measurements of the lithium metal cells, made with calibrated Cf-252 sources, matched the Monte Carlo neutral particle (MCNP) calculations within ten percent (10%) as shown in Table 1. It can be appreciated that the calculations for a Lithium Fluoride (LiF) layer are less accurate due to the uncertainty of the composition of the LiF layer. The results indicate that the physical principles of detector operation are well understood and that the model and teachings of the present invention can be extended toward further optimization.

As shown in Table 1, the efficiency of the detector with 6LiF is about half of that with 6Li foil. As such, both materials are suitable and economically practical for use with the detector according to the present invention. The data of Table 1 illustrates excellent agreement (less than 10% difference) between the theoretical model and experimental results. In some applications LiF may be preferred because it is more stable than Li metal. The penalty for its use being a reduction of efficiency by a factor of two.

It is to be understood that a 6Li ionization chamber (e.g., the cathode described above with a capturing layer made from 6Li) has gross gamma radiation sensitivity that is similar to the sensitivity of a small ionization chamber typically used for safeguard application. The gamma sensitivity is due to the interaction of the gamma radiation with the metal cathode within the detector that produces free electrons into the gas volume. These electrons ionize the gas in the chamber and produce current proportional to the gamma field.

In the above-described detector having a cathode with an interior measuring approximately 5"×5"×2.5", about 1000 cubic centimeters of working gas such as argon, can be held therein under atmospheric pressure. This exemplary, non-limiting embodiment of the detector has an interior wall surface of approximately six hundred centimeters squared (600 cm$^2$) For comparison, a one meter (1 m) long, twelve millimeter (12 mm) diameter ionization chamber with a working gas pressurized to ten atmospheres (10 atm) has a nearly equivalent volume of gas, eleven hundred cubic centimeters (1100 cm$^3$) and a wall area of approximately three hundred and eighty centimeters squared (380 cm$^2$). Each chamber has similar sensitivity to gamma radiation.

As recognized by the present invention, a combined signal from gamma and neutron pulses has the following characteristics: (1) the gamma interaction rate is much higher than the neutron interaction rate, but the average amplitude of the charge per gamma event is orders of magnitude lower than the charge from a neutron event (therefore, the signal at a preamplifier, described below, can be considered as a fluctuating DC current), and (2) the neutron pulses are relatively rare and easily distinguished as discrete events.

Figure 9:
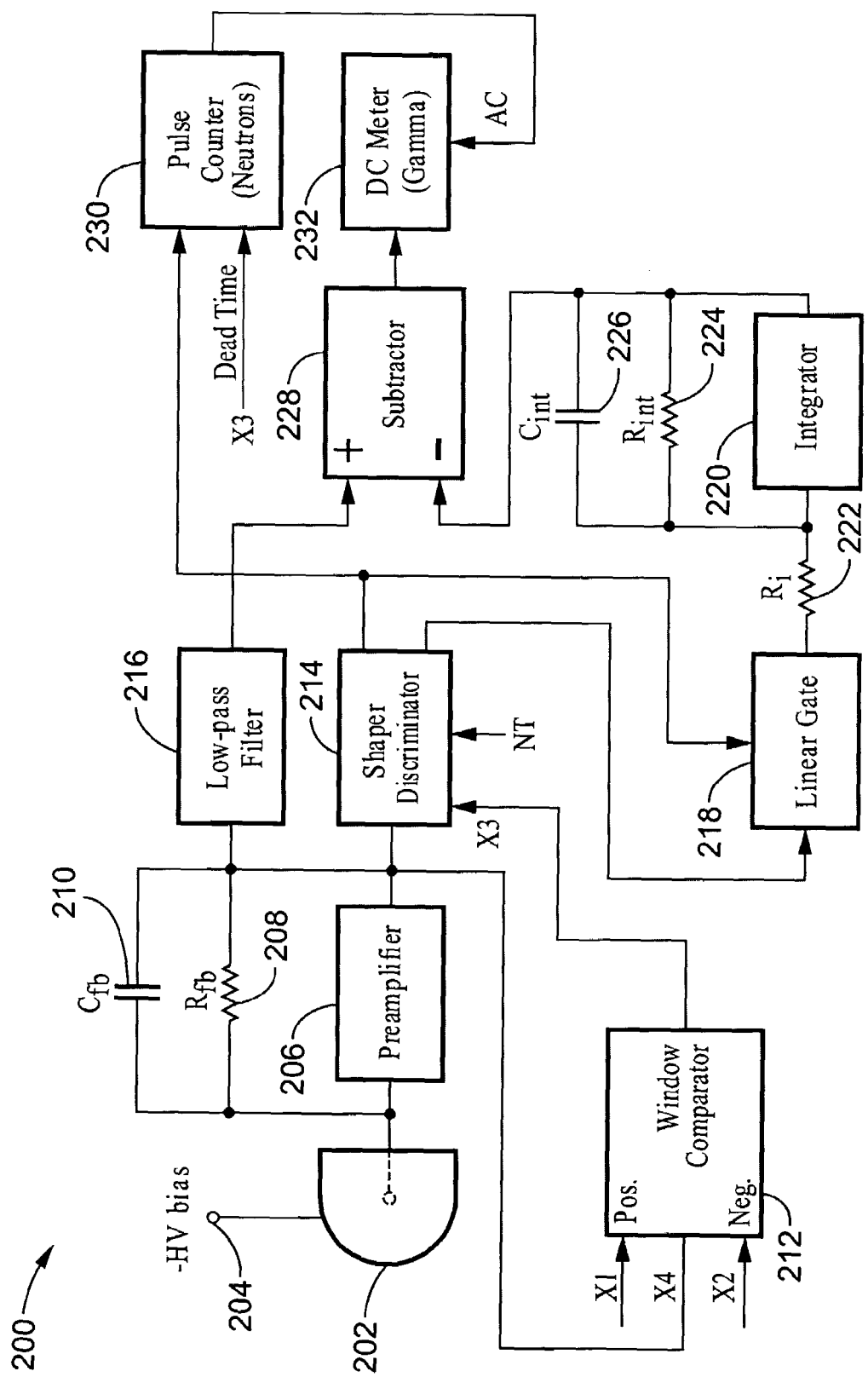
FIG. 9 is a schematic of a processing circuit for separating neutron pulses from gamma pulses according to an aspect of the present invention.

Referring now to FIG. 9, a non-limiting, exemplary embodiment of a circuit for separating neutron pulses from gamma pulses is shown and is generally designated 200. FIG. 9 shows that the circuit 200 includes a neutron and gamma radiation detector 202 (e.g., the detector 10 shown in FIG. 1 through FIG. 6) that is connected to a high voltage bias source 204. As shown, a preamplifier 206 is connected to detector 202 and receives signals therefrom. Preferably, a feedback resistor ($R_{fb}$) 208 is connected across the poles of preamplifier 206; that is, across the input and output of preamplifier 206. Also, a feedback capacitor ($C_{fb}$) 210 can be connected across the poles of preamplifier 206. As shown, feedback resistor $R_{fb}$ 208 and feedback capacitor $C_{fb}$ 210 are connected parallel to preamplifier 206, forming a so-called charge-sensitive preamplifier. The output of preamplifier 206 is connected to the inputs of low-pass filter 216, signal input of shaper/discriminator 214, and signal input to window comparator 212. The output of window comparator 212 is connected to the veto input of shaper/discriminator 214, whose outputs include a pulse signal analog output and a digital pulse output. Still referring to FIG. 9, window comparator 212, shaper/discriminator 214, and low-pass filter 216 are connected to preamplifier 206, $R_{fb}$ 208, and $C_{fb}$ 210. In a preferred embodiment, the linear input of a linear gate 218 is connected to analog output of shaper/discriminator 214. The logic output of the shaper/discriminator is connected to the gate input of linear gate 218 and the counting input of the pulse counter 230.

FIG. 9 also shows an integrator 220 connected to the output of linear gate 218. A resistor 222 can be connected in series between linear gate 218 and integrator 220 to scale the input to integrator 220. Moreover, an integrator resistor ($R_{int}$) 224 and capacitor ($C_{int}$) 226 is connected across the poles of integrator 220; that is, from the input of integrator 220 to the output of integrator 220. As shown, $R_{int}$ 224 and $C_{int}$ 226 are connected in parallel to integrator 220. It should be appreciated that charge-sensitive preamplifier formed with components 206, 208, 210 are similarly configured to perform integration. As shown in FIG. 9, a positive input of subtractor 228 is connected to the output of low-pass filter 216, and the negative input is connected to integrator 220 in combination with $R_{int}$ 224 and $C_{int}$ 226, whereby neutron pulse contribution is removed from the DC gamma. Preferably, a pulse counter 230 is connected to the logic output of shaper/discriminator 214 for counting neutron pulses. Additionally, as shown in FIG. 9, a direct current (DC) meter 232 can be connected to the output of subtractor 228 for monitoring gamma pulses. An output from pulse counter 230, as shown is also preferably connected to DC meter 232.

As can be seen from FIG. 9, the current pulses from detector 202 are integrated by charge-sensitive preamplifier 206, in combination with Cfb and Rfb and converted into a train of overlapping pulses. Each pulse has the following parameters: (1) a rise time equal to the duration of the current pulse (the collected charge); (2) a pulse height proportional to the area of the current pulse; (3) an exponential decay $T_p=R_{fb} \times C_{fb}$ determined by the pole of the preamplifier. (i.e. exponential decay $T_p$ lies in the millisecond range and pulse duration in the microsecond range.)

The gamma pulses have significantly lower amplitudes and higher detection rates (detection frequency) than the neutrons; therefore, they appear as a fluctuating DC voltage drop on feedback resistor 208. The signal from the preamplifier is converted in shaper/discriminator 214 into single Gaussian pulses, with microseconds duration and pulse height proportional to the collected charge. The pulses with amplitude above the neutrons threshold (NT) which are input to shaper/discriminator 214 are thereby qualified as neutron pulses and generate logic pulses (LP) counted in pulse counter 230.

An optional window comparator 212 is shown connected within the processing circuitry to increase noise immunity against mechanical shock and vibrations. Output from preamplifier 206 is connected to an input of window comparator 212, whose output is preferably connected to both the veto input of shaper/discriminator 214 and the dead-time correction input of neutron counter 230.

It should be appreciated that the shock and vibration frequencies are much lower than the time constant of shaper/discriminator 214. Therefore, the signal generated in response to shock and vibrations can saturate the output of preamplifier 206 whose sensitivity is inversely-proportional to the signal frequency. The saturation of the preamplifier can result in a discontinuity of the preamplifier voltages, wherein two pulses are formed with opposite polarity one by entering saturation and the second by going back out of saturation. Window comparator 212 compares the preamplifier output voltage with a positive and negative going threshold X1 and X2 that are set closer to the levels of saturation of the preamplifier signal, but within the linear range of the preamplifier voltage. During normal operation, the preamplifier voltage does not reach these threshold levels. When shock disturbance causes an excursion on the output of preamplifier 206 beyond these thresholds levels, window comparator 212 produces a veto signal X3 that blocks the output from shaper/discriminator 214 and thereby prevents counting of false pulses. Additionally, the output of window comparator 212 is shown utilized for extending the counting time in the neutron counter, thus correcting efficiency losses due to the dead time. Furthermore, the output from window comparator 212 can be utilized as a mechanical disturbance indicator and for indicating the relative operating status of the detector unit.

The analog pulses (AP) are gated in linear gate 218 and are integrated by the RC integrator 220. The pulse at the output of integrator 220 has the following parameters: (i) rise time equal to the duration of the shaped analog pulse AP from the output of the shaper discriminator; (ii) pulse height proportional to the area of the shaped analog pulse AP, respectively, to the voltage step at preamplifier 206; (iii) exponential decay time constant $T_{int}=C_{int}\times R_{int}$.

Because the preamplifier pulses have shorter rise time than those from the integrator, they are processed by low-pass filter 216 in order to match the rise time of the integrator's pulses. The pulse heights from low-pass filter 216 and integrator 220 are matched by resistor $R_{int}$ 224.

Thus, all neutron pulses that are above the neutron threshold NT are canceled by pulse-by-pulse subtraction in subtractor module 228. Note that subtraction takes into account even the ballistic deficiency caused by the short shaping time and pile-ups of two or more neutron pulses.

The neutron pulses below the threshold comprise only a minor percentage (below 10%) of the total neutron count and in addition their pulse height is much smaller than the average neutron pulse. The neutron pulses below the threshold could be subtracted as an average current (AC) proportional to the neutron count rate.

The approach described above is applicable also to the 3He tubes, as they also exhibit a gap between the gamma and neutron distributions.

Figure 10:
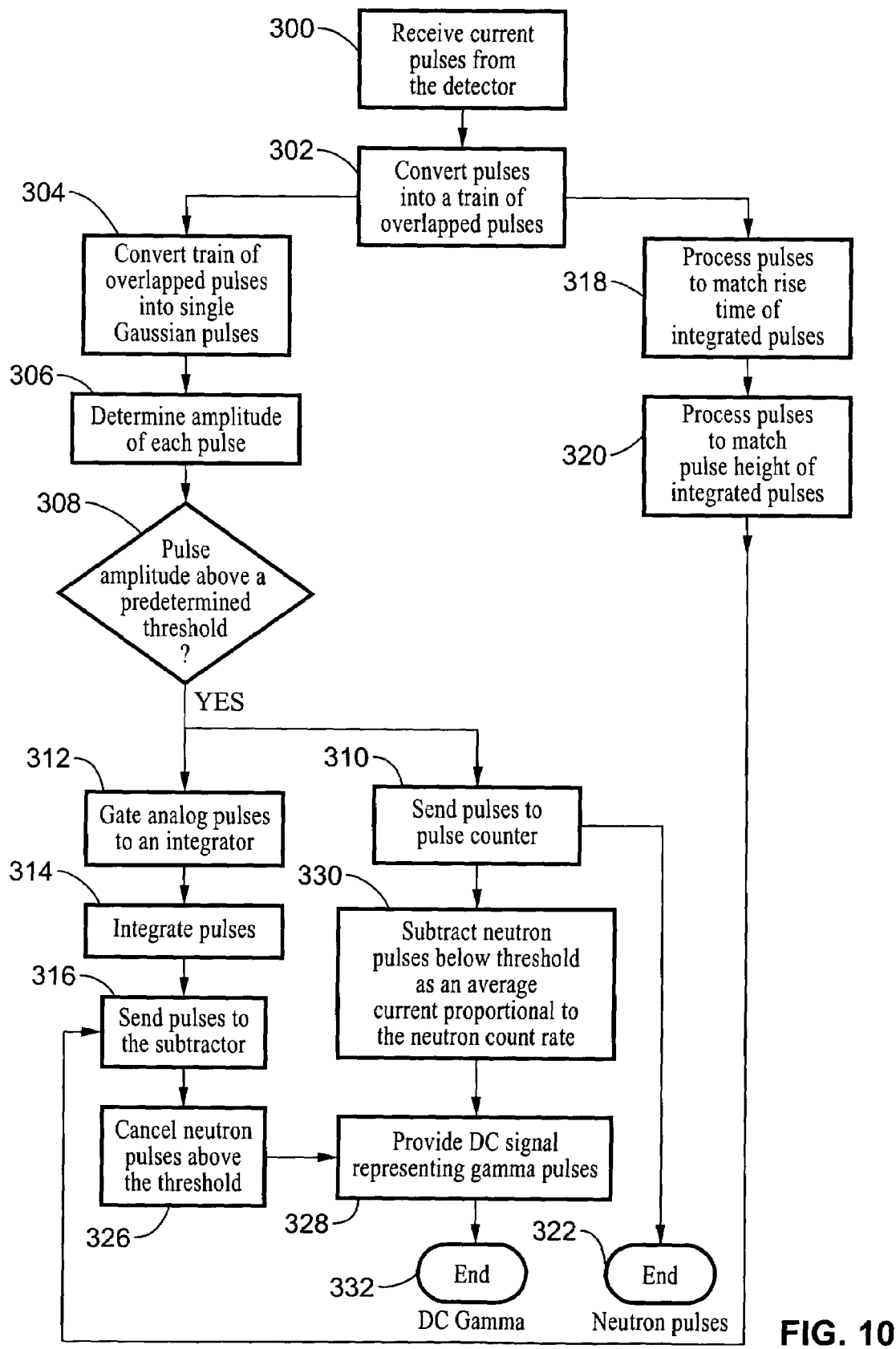
FIG. 10 is a flow chart of logic for separating neutron pulses from gamma pulses according to an aspect of the present invention.

FIG. 10 exemplifies logic for separating (distinguishing one from the other) neutron pulses from gamma pulses. It should be appreciated that separation may be performed by alternative circuitry without departing from the teachings of the present invention. Commencing at block 300 current pulses are received, such as preamplifier 206 from detector 202. At block 302 pulses are converted into a train of overlapping pulses, such as at preamplifier 206. It is to be understood that each of the pulses has a rise time generally equal to the duration of the current pulse (i.e., the collected charge). Moreover, each pulse has a pulse height that is proportional to the area of the current pulse. Additionally, the exponential decay can be determined by the preamplifier poles such that $T_p=R_{fb}\times C_{fb}$, where $T_p$ is the exponential decay time constraint, $R_{fb}$ is the feedback resistance and $C_{fb}$ is the feedback capacitance. $T_p$, for example, lies in the millisecond range and the pulse duration lies in the microsecond range.

It is to be understood that the gamma pulses have much lower amplitudes and occur at a more frequent rate than the neutron pulses. As such, the gamma pulses appear as a fluctuating DC voltage drop on the $R_{fb}$ 208. Returning to the logic at block 304 the train of overlapping pulses is converted into single Gaussian pulses, such as by passing the signals from preamplifier 206 to shaper/discriminator 214. Each Gaussian pulse has approximately a microsecond duration and a pulse height proportional to the collected charge. Moving to block 306, the amplitude of each pulse is determined.

At decision block 308, it is determined whether the pulse amplitude is above a predetermined threshold; for example, the threshold at which the pulses can be considered neutron pulses that generate logic pulses. Pulses below the neutron threshold are ignored. If, however, the pulse amplitude exceeds the predetermined threshold, then block 310 is executed with pulses considered neutron pulses being sent to a means for registering the neutron pulses, such as pulse counter 230, ending the neutron count process at block 322. Simultaneously, analog pulses are gated, such as by linear gate 218, for integration to cancel the effect of neutron pulses (exceeded the neutron threshold) on the DC gamma signal.

Proceeding to block 314, the analog pulses exceeding the neutron threshold are integrated, such as by integrator 220. It is to be understood that the integrated pulses have a rise time that is substantially equal to the duration of the shaped pulses from shaper/discriminator 214. Moreover, the integrated pulses have a pulse height that is substantially proportional to the area of the shaped pulses from shaper/discriminator 214. Additionally, the integrated pulses have an exponential decay time that can be determined by $T_{int}=C_{int}\times R_{int}$, wherein $T_{int}$ is the exponential decay time, $C_{int}$ is the integrator capacitance, and $R_{int}$ is the integrator resistance. Thereafter, at block 316 the pulses are sent to a subtractor means, such as subtractor 228.

It is to be understood that while the logic steps 304 through 316 are undertaken, simultaneous signal processing at blocks 318 and 320, are performed as described below. It is to be further recognized that the simultaneous processing undertaken from logic step 318 through logic step 320 converges at block 310 and 316 with the processing undertaken from logic step 304 through 316. At block 318 the pulses are processed to match the rise time of the integrated pulses, such as in response to the pulses from preamplifier 206 being processed by low-pass filter 216 in order to match the rise time of the integrated pulses. Next, at block 320 the pulse heights of the pulses, such as from integrator 220, are processed to match the pulse heights of the pulses from preamplifier 206, which can be accomplished by properly selecting the value of resistor $R_f$ 222 coupled between linear gate 218 and integrator 220. The pulses are then sent to the subtractor as represented by block 316.

At block 326, the pulses above the threshold are cancelled by subtraction, such as at subtractor 228. It is to be understood that subtraction takes into account the ballistic deficiency caused by the short shaping time and pile-ups of two or more neutron pulses. Continuing the description of the logic, a DC signal representing Gamma pulses is provided at block 328.

It is to be understood that the neutron pulses below the predetermined threshold are a small percentage (e.g., below ten percent) of the total neutron count and their pulse height is much smaller than the average neutron pulse. As such, at block 330, the neutron pulses below the threshold can be subtracted as an average current proportional to the neutron count rate, such as is being received by pulse counter 230. A fluctuating DC signal is then generated as per block 328 representing Gamma signals, after which processing terminates at block 332.

It can be appreciated that the above circuit and logic for separating neutron pulses from gamma pulses received at detector 202 can also be used in conjunction with a detector utilizing 3He tubes, or similar other detectors, since these detectors also exhibit a gap between the gamma and neutron distributions.

Figure 11:
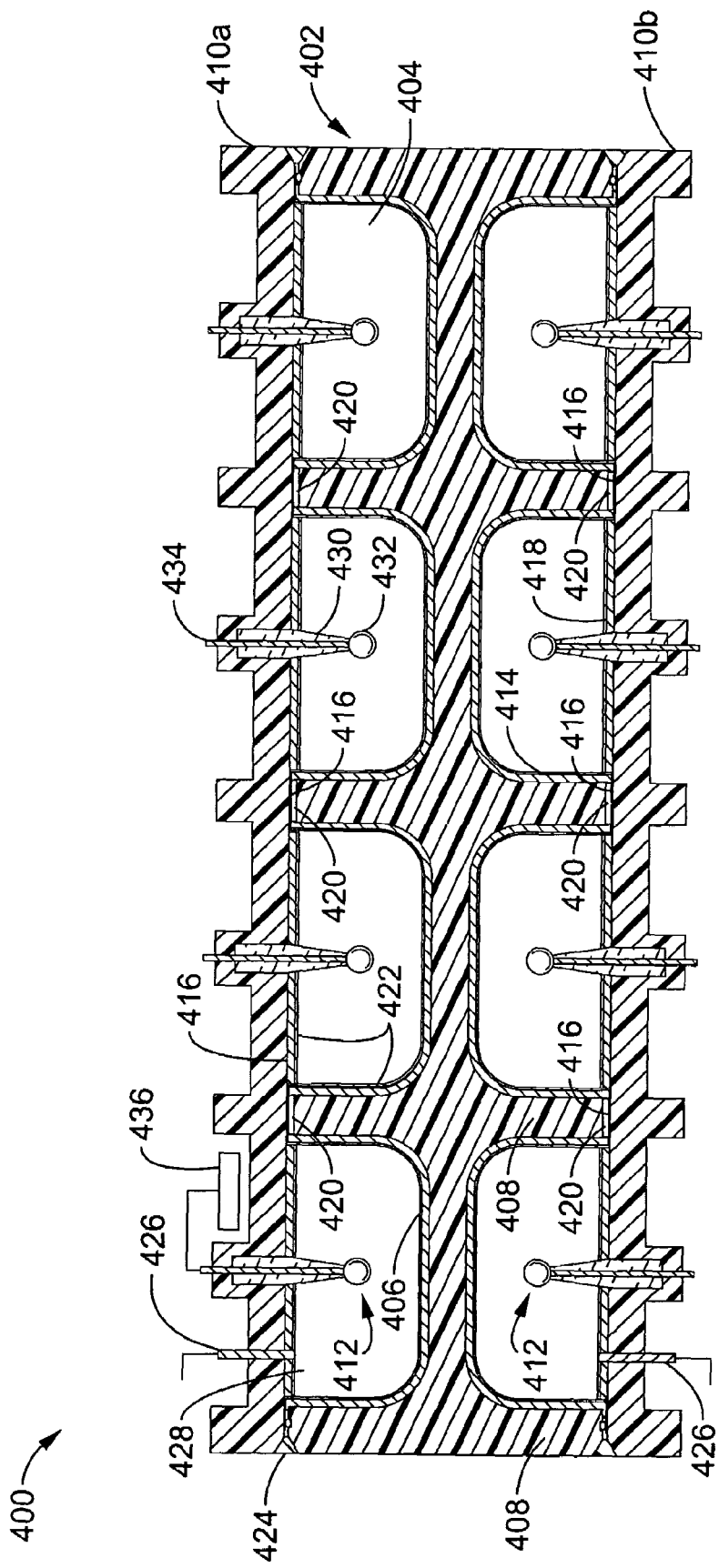
FIG. 11 is a cross-section of a radiation detector array according to an aspect of the present invention, shown with back-to-back array chambers sealed with lids through which collector electrodes protrude.

FIG. 11 is another embodiment of the present invention 400 having a back-to-back detector cell array. The device comprises a honeycomb body 402 for retaining working gases within chambers (wells) 404 defined by a base 406 with protruding vertical ribs 408. Well geometry is shown as that of a half-cube with filleted interior corners, although other geometries may be adopted. Two lids 410a, 410b (preferably fabricated from plastic) are shown covering well openings on opposing top and bottom sides of body 402. Feedthrough electrodes 412 protrude through lids 410a, 410b near the center of each cell. A metal layer 414 is joined to the interior surfaces of the wells, preferably except for contact surfaces 416. Similarly, a metal layer 418 is joined to the interior surface of the lids, preferably except in the contact area 416.

The internal volumes of cells 404 are connected with each other through metalized channels 420 in the vertical ribs 408 joined with base 406 that forms plastic honeycomb body 402. All interior metalized surfaces on the body and lids that form the semi-cubical cells are laminated with 6Li foil 422 with a preferred thickness of approximately 30 uk. The metalization on the lids and honeycomb body are hermetically sealed together, such as utilizing a low outgassing adhesive, silicone gasket, or any other convenient sealing method. It should be appreciated that the selection of sealing method is generally dependent on the method of metalization employed.

The lids are connected to plastic body 408, such as by plastic welding 424. At least one pinch-off tube 426, or similar means of communicating gaseous fluids with the interior wells, extends through each lid 410a, 410b. Alternatively, a channel could be formed between the upper and lower chambers, wherein only a single pinch-tube would be required. The pinch-tubes, or similar means, allow evacuating the air and introducing the working gas. In the present embodiment the pinch-off tube(s) also preferably serve as a cathode electrode, wherein it is connected to the negative HV bias supply.

The feedthrough electrode 412 for these semi-cube like chambers preferably comprises a ceramic insulator 430, a spherical anode 432, and a connection wire 434 fused in the ceramic insulator passing through lid 410a, 410b for connection to detection electronics. The electrode is preferably sealed to the metalized surface, such as by utilizing a vacuum compound (i.e. Staycast™). Alternative embodiments of electrode 412 may be fabricated by extending the insulating portion 430 to make contact with other cell surfaces, such as the opposing surface of the chamber formed on base 406. It will be appreciated that increased detection accuracy can be obtained by increasing vibrational resistance of the electrode within the detector cell. Vibration resistance can be increased by supporting the electrode between additional surfaces within the cell. For example, within the detector cell of FIG. 11 having closing lids 410a, 410b, more rigid retention of electrode 412 may be obtained by adapting insulating portion 430 with a projecting insulating structure or structures, preferably having compliant exterior portions, that come into contact or otherwise engage adjacent or more preferably opposing surfaces within the cell. In this way in response to closing lid 410a or 410b the compliant portions are compressed (loaded) wherein the support structure and attached anode is prevented from moving within the detector cell. Based on the above teachings, it should be understood that a number of alternate or additional mechanisms may be utilized by one of ordinary skill in the art to increase the vibrational resistance of electrode 412 without departing from the teachings of the present invention.

Each cell preferably has one electrode, although cells may be constructed having multiple electrodes without departing from the teachings of the present invention. The electrodes are connected to an electronics module 436, such as by a connecting wire. The electronics module is configured with a means for processing the signal, such as comprising a preamplifier and shaper/discriminator and auxiliary circuitry exemplified by FIG. 9. It will be appreciated that each electronics module may be connected to one or more detector anodes. It is preferable to minimize lead length from the anode to the input of the respective preamplifier. For example, manufacturing costs may be reduced by clustering a series of cells (in 2D or 3D) about an electronics module (or a preamplifier with additional circuits located remotely) wherein the anodes from the cluster of cells are directed inward to the preamplifier input. The neutron and gamma information from all electronics modules is summed to represent the signals for the whole detector.

Detectors according to the present invention may be manufactured in a number of alternative ways, the following two being described by way of example and not limitation.

In a first method a detector, or detector array, can be manufactured as a plastic part by injection molding followed by processing steps generally including electroplating, sputtering and vacuum deposition of the metal liner and lithium foil. This method is generally exemplified by the detector shown in FIG. 11. The following steps comprise the first manufacturing process.

(a) Manufacturing the plastic body and the lid(s) by injection molding.

(b) Fusing the feedthrough insulator(s) and the pinch-off tube(s) in the lid(s).

(c) Metalizing the entire surface of the plastic body and lid(s), except the contact surfaces, feedthrough electrode(s) and pinch-off tube(s).

(d) Laminating the entire surface of the cell(s) with 6Li foil, or similar, by any convenient method with foil lamination, vacuum deposition and sputtering processes being preferred.

(e) Joining the lid(s) to the plastic body and sealing the surfaces, such as by vacuum compound, O-ring, or any other convenient sealing means.

(f) Evacuating the entire volume of the detector chamber, or array of detector chambers, and assuring seal integrity, followed by filling the volume with working gas and sealing the detector device.

(g) Connecting exterior chamber metalization to ground potential for safety. Connecting the feedthrough electrodes to the electronics circuits. Pinching off tubes and connecting them to provide a connection to the HV bias.

A second example of a manufacturing process is performed by creating the chamber metalization and encasing it in an insulator such as plastic. One preferred method of performing this is by deep drawing or stamping, in what may be considered a similar process to forming a muffin tin. The following steps comprise the second manufacturing process.

(a) Forming by deep drawing from a metal sheet a metal part where the cavities of the cell, or preferably cells, are drawn from the flat surface or as separate cups, thereby creating a sheet with cavities or separate cups.

(b) Forming a sheet with a hole(s) corresponding to the feedthrough electrode(s) for each cell, thereby creating a sheet for the electrodes. It should be appreciated that the sheet can be flat to create a simple lid(s), or formed with recessed to create a more complex lid(s).

(c) Installing and sealing the feedthrough electrode(s) to the lid(s).

(d) Applying the 6Li layer by any convenient method.

(e) Assembling and sealing the lid(s) containing the electrode(s) to the cavity, or cavities, to form the metalization of a detector, or detector array.

(f) Inserting one or more detector(s) metalization into a mold around which an insulator, such as plastic (i.e. HDPE) is formed, for example in a molding process.

(g) Evacuating the entire volume of the chamber(s) and assuring that it is leak free.

(h) Filling the entire volume of the chamber(s) with working gas and sealing it.

(i) Applying electroconductive material, such as paint, to the outside surface to provide electrostatic shielding.

Figure 12:
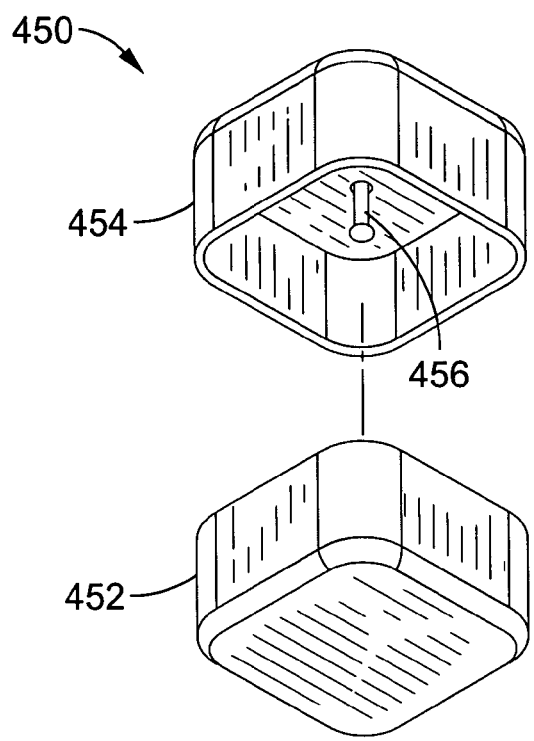
FIG. 12 is a perspective view of an ionization chamber according to an aspect of the present invention, shown formed from two metallic halves.
Figure 13:
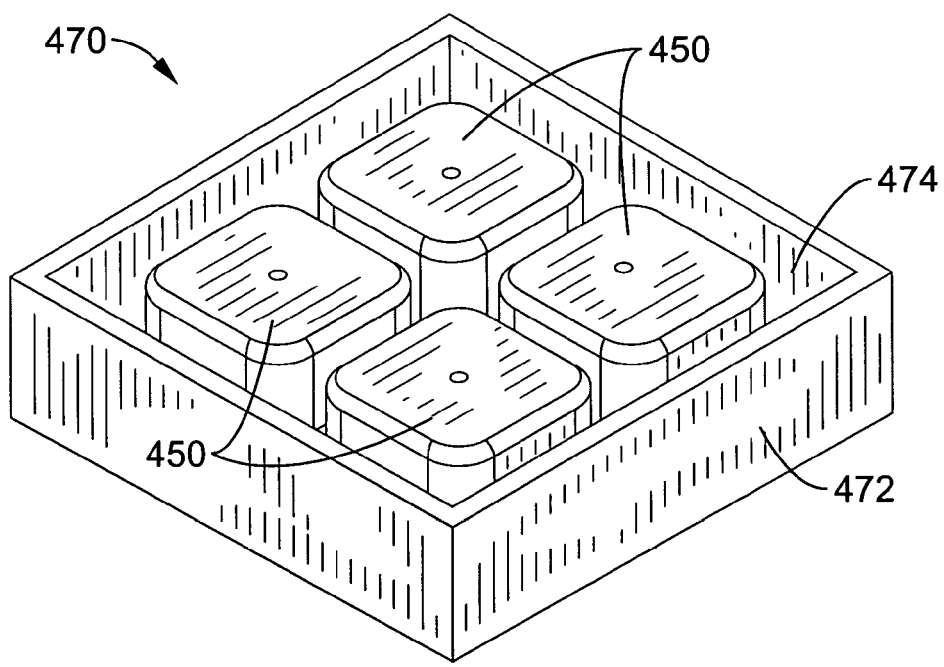
FIG. 13 is a perspective view of ionization chambers as shown in FIG. 12 being assembled into an insulated detector array.

FIG. 12 and FIG. 13 depict the above manufacturing method. In FIG. 12 a single cell 450 is formed from a metallic chamber base 452 with a preferably recessed lid 454 containing electrode 456. The 6Li layer, or layers, are applied to the interior chamber halves and the electrode is installed and sealed. Once the interiors of the chambers are prepared, then the top and bottom halves are joined to form a single metallic chamber that is ready to be encapsulated. FIG. 13 shows a mold 470 associated with this method of encapsulation wherein cells 450, four are shown, are placed within the interior space 474 of a mold housing 472. A material, such as plastic (i.e. HDPE) is then poured, or otherwise applied, to fill in the spaces. It will be appreciated that any number of cells can be created in this molding process, and that any convenient form of molding, or alternative forms of encapsulation may be utilized without departing from the teachings of the present invention.

It is to be understood that the present invention is inherently rugged due to the HDPE material and can operate over a broad range of temperature, humidity, and caustic environments without significant performance degradation since the processing electronics are preferably sealed in HDPE. Moreover, the ionization chamber operation mode of the present invention can allow a more uniform field between the electrodes, so the field at the cathode can be high enough to effectively separate the electron-ion pairs created adjacent to the surface. These pairs are created from low energy tritons and alphas just escaping the surface. By collecting the charge, instead of letting the pairs recombine, pulses from these events are collected and counted and the overall efficiency is increased.

Additionally, the detector of the present invention has sufficient gross gamma-ray sensitivity to be useful for the detection of gamma rays. One example of a useful application of this feature includes the detection of radiological dispersal devices. The device of the present invention can be used for the detection of medical or radiographic sources, but cannot distinguish between different types. Conversely, tailoring the present invention to be less sensitive to gamma rays allows the development of a detector that can be useful for the measurement of neutrons in high gamma fields, such as in the measurement of spent fuel elements in storage ponds.

From the foregoing description, it can be seen that the present invention exhibits advantages over previously developed detectors that include, but are not limited to, use of an ionization technique rather than proportional counter range, spherical-shaped working gas encasement, no need for a central wire that exhibits high capacitances and which induces unwanted signal noise in response to acoustical and mechanical vibration, and no dangerous high voltage potential is maintained on the exterior of the detector.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

MCNP Calculations and Experimental Measurements

| Absorber Thickness | MCNP Calculated [cps] | Det. #2 (40 uk Li foil) 95% ROI [cps] | Det. #2 (40 uk Li foil) Corrected to 100% [cps] | Det. #2 (60 uk Li foil) 95% ROI [cps] | Det. #2 (60 uk Li foil) Corrected to 100% | TD. #2 (7.8 uk LiFl) 95% ROI [cps] | TD. #2 (7.8 uk LiFl) Corrected to 100% |
|---|---|---|---|---|---|---|---|
| 30 uk Li foil | 1820 | | | | | | |
| 40 uk Li foil | 1520 | 1368 | 1436.4 | | | | |
| 60 uk Li foil | 1430 | | | 1296 | 1360.8 | | |
| 7.8 uk LiF | 910 | | | | | 722 | 687 |

What is claimed is:

1. A detector for detecting neutrons and gamma radiation, comprising:
   at least one cathode;
   wherein the cathode defines an interior surface and an interior volume;
   a plastic housing surrounding the cathode;
   at least one plastic lid attached to the housing;
   wherein the lid encloses the interior volume of the cathode;
   at least one anode extending from the lid into the interior volume of the cathode;

at least one working gas disposed within the interior volume of said cathode; and at least one conductive neutron-capturing layer at least partially disposed on the interior surface of the cathode;

wherein the plastic housing is configured to function as a structural component and a moderator of neutrons.

2. A detector as in claim 1, wherein said plastic housing is made from high density polyethylene (HDPE).

3. A detector as in claim 1, wherein said plastic lid is made from high density polyethylene (HDPE).

4. A detector as in claim 1:

wherein said working gas comprises a gas exhibiting high stopping power for charged particles;

wherein said working gas is chosen from the group of gasses consisting essentially of argon and xenon.

5. A detector as in claim 1, wherein said conductive neutron-capturing layer is chosen from the group consisting essentially of lithium-6 (6Li), and a lithium-6 compound.

6. A detector as in claim 1, further comprising:

an electrostatic shield layer at least partially covering the housing.

7. A detector as in claim 1, further comprising:

an electrostatic shield layer at least partially covering said lid.

8. A detector as in claim 1, wherein said lid is welded to said housing.

9. A detector as in claim 1, wherein said anode is affixed to a hermetically sealed feed-through insulator that extends from said lid into the interior volume.

10. A detector as in claim 9, wherein said anode is disposed near the center of the interior volume.

11. A detector as in claim 1, further comprising:

a high voltage bias source electrically connected to the cathode.

12. A detector as in claim 1, further comprising:

processing electronics electrically connected to said anode;

wherein said processing electronics are configured to operate said anode in pulse mode for the detection of neutrons and DC mode for the detection of gammas.

13. A detector as in claim 12, wherein said processing electronics includes logic for separating neutron pulses from gamma pulses.

14. A detector for detecting neutrons and gamma radiation, comprising:

an array of cathodes;

wherein half of said cathodes are upward facing;

wherein half of said cathodes are downward facing;

wherein each cathode defines an interior surface and an interior volume;

a plastic housing surrounding said cathodes;

a plastic top cover attached to said housing;

wherein the top cover encloses the interior volumes of said upward facing cathodes;

a plastic bottom cover attached to the housing opposite said top cover;

wherein said bottom cover encloses the interior volumes of said downward facing cathodes;

at least one anode extending from said top cover and said bottom cover into the interior volume of each cathode;

at least one working gas disposed within the interior volume of each cathode; and at least one conductive neutron-capturing layer at least partially disposed on the interior surface of each cathode.

15. A detector as in claim 14, wherein said plastic housing comprises a high density polyethylene (HDPE).

16. A detector as in claim 14, wherein said top cover comprises a high density polyethylene (HDPE).

17. A detector as in claim 14, wherein said bottom cover comprises a high density polyethylene (HDPE).

18. A detector as in claim 14, wherein said working gas comprises a gas mixture exhibiting high stopping power for charged particles.

19. A detector as in claim 14, wherein said working gas is chosen from the group of gases consisting essentially of argon and xenon.

20. A detector as in claim 14, wherein said conductive neutron-capturing layer is chosen from the group consisting essentially of lithium-6 (6Li), boron-10 (10B), gadolinium (Gd), a lithium-6 compound, a boron-10 compound, and a gadolinium compound.

21. A detector as in claim 14, further comprising:

an electrostatic shield layer at least partially covering said housing.

22. A detector as in claim 21, further comprising:

an electrostatic shield layer at least partially covering said top cover.

23. A detector as in claim 22, further comprising:

an electrostatic shield layer at least partially covering said bottom cover.

24. A detector as in claim 14, wherein said top cover is welded to said housing.

25. A detector as in claim 24, wherein said bottom cover is welded to said housing opposite said top cover.

26. A detector as in claim 14, wherein each said anode is affixed to a hermetically sealed feed-through insulator that extends from said top cover or said bottom cover.

27. A detector as in claim 26, wherein each anode is disposed near the center of a respective interior volume of a said cathode.

28. A detector as in claim 14, further comprising a high voltage bias source electrically connected to the cathodes.

29. A detector as in claim 14, further comprising:

processing electronics electrically connected to each anode.

30. A detector as in claim 29, wherein said processing electronics comprises a single set of processing electronics that is electrically connected to said anodes.

31. A detector as in claim 30, wherein said processing electronics includes logic for separating neutron pulses from gamma pulses.

32. A detector for detecting neutrons and gamma radiation, comprising:

at least one cathode;

wherein said cathode defines an interior surface and an interior volume;

at least one anode extending into the interior volume of said cathode;

at least one working gas disposed within the interior volume of said cathode;

at least one conductive neutron-capturing layer at least partially disposed on the interior surface of said cathode;

a plastic housing surrounding said cathode;

wherein the plastic housing is configured to function as a structural component and a moderator of neutrons;

at least one high voltage bias source electrically connected to said cathode; and processing electronics electrically connected to said anode, the processing electronics including logic for separately registering neutron pulses and gamma pulses.

33. A detector as in claim 32, wherein said plastic housing comprises a high density polyethylene (HDPE).

34. A detector as in claim 32, further comprising:
at least one plastic lid attached to said plastic housing;
wherein said lid encloses the interior volume of said cathode; and
wherein said anode extends from said plastic lid into the interior volume of said cathode.

35. A detector as in claim 34, wherein said plastic lid comprises a high density polyethylene (HDPE).

36. A detector as in claim 34, further comprising:
an electrostatic shield layer at least partially covering said plastic housing.

37. A detector as in claim 34, further comprising:
an electrostatic shield layer at least partially covering said lid.

38. A detector as in claim 34, wherein said lid is welded to said plastic housing.

39. A detector as in claim 34, wherein said anode is affixed to a hermetically sealed feed-through insulator that extends from said lid into said interior volume.

40. A detector as in claim 39, wherein said anode is disposed near the center of the interior volume of said cathode.

41. A detector as in claim 32:
wherein said working gas comprises a gas exhibiting high stopping power for charged particles;
wherein said working gas is chosen from the group of gasses consisting essentially of argon and xenon.

42. A detector as in claim 32, wherein said conductive neutron-capturing layer is chosen from the group consisting essentially of lithium-6 (6Li), and a lithium-6 compound.

43. A detector for detecting neutrons and gamma radiation, comprising:
at least one cathode;
wherein said cathode defines an interior surface and an interior volume;
at least one anode extending into the interior volume of said cathode;
at least one working gas disposed within the interior volume of said cathode;
at least one conductive neutron-capturing layer at least partially disposed on the interior surface of said cathode;
at least one high voltage bias source electrically connected to said cathode;
processing electronics electrically connected to said anode and configured with logic for separating neutron pulses from gamma pulses;
wherein said processing electronics includes logic for:
receiving plural current pulses from said anode;
converting said current pulses into a train of overlapping pulses;
converting said train of overlapping pulses into plural Gaussian pulses;
sending each Gaussian pulse having an amplitude above a predetermined threshold to a pulse counter; and
integrating each Gaussian pulse having an amplitude below the predetermined threshold to establish plural integrated pulses.

44. A detector as in claim 43, wherein said processing electronics further includes logic for:
processing said train of overlapped pulses to yield processed pulses, each processed pulse having a rise time that matches a rise time of each integrated pulse.

45. A detector as in claim 44, wherein said processing electronics further includes logic for:
processing each processed pulse to match the height of each processed pulse with each integrated pulse.

46. A detector as in claim 45, wherein said processing electronics further includes logic for:
canceling each processed pulse having an amplitude above a predetermined threshold.

47. A detector as in claim 46, wherein said processing electronics further includes logic for:
subtracting each processed pulse having an amplitude below the predetermined threshold as an average current proportional to a neutron count rate in the pulse counter.

48. A detector as in claim 47, wherein said processing electronics further includes logic for:
outputting a direct current signal (DC) representing gamma pulses.

49. A method for detecting neutrons and gamma radiation, comprising:
providing at least one cathode having an interior surface and an interior volume;
providing a plastic housing around said cathode;
wherein the plastic housing is configured to function as a structural component and a moderator of neutrons;
providing at least one anode that extends into the interior volume of each said cathode;
providing at least one working gas within the interior volume of said cathode;
providing at least one conductive neutron-capturing layer at least partially disposed on the interior surface of said cathode;
providing at least one high voltage bias source that is electrically connected to said cathode; and
providing processing electronics that are electrically connected to said anode, said processing electronics including logic for separating neutron pulses from gamma pulses.

50. A method for detecting neutrons and gamma radiation, comprising:
providing at least one cathode having an interior surface and an interior volume;
providing a plastic housing around said cathode;
providing at least one anode that extends into the interior volume of each said cathode;
providing at least one working gas within the interior volume of said cathode;
providing at least one conductive neutron-capturing layer at least partially disposed on the interior surface of said cathode;
providing at least one high voltage bias source that is electrically connected to said cathode; and
providing processing electronics that are electrically connected to said anode, said processing electronics including logic for separating neutron pulses from gamma pulses;
wherein said processing electronics includes logic for:
receiving plural current pulses from said anode;
converting said current pulses into a train of overlapped pulses;
converting said train of overlapped pulses into plural Gaussian pulses;
sending each Gaussian pulse having an amplitude above a predetermined threshold to a pulse counter; and
integrating each Gaussian pulse having an amplitude below said predetermined threshold to establish plural integrated pulses.

51. A method as in claim 50, wherein said processing electronics further includes logic for:
processing said train of overlapped pulses to yield processed pulses, each processed pulse having a rise time that matches a rise time of each integrated pulse.

52. A method as in claim 51, wherein said processing electronics further includes logic for:
processing each processed pulse to match the height of each processed pulse with the height of each integrated pulse.

53. A method as in claim 52, wherein said processing electronics further includes logic for:
canceling each processed pulse having an amplitude above a predetermined threshold.

54. A method as in claim 53, wherein said processing electronics further includes logic for:
subtracting each processed pulse having an amplitude below said predetermined threshold as an average current proportional to a neutron count rate in the pulse counter.

55. A method as in claim 54, wherein said processing electronics further includes logic for:
outputting a direct current signal (DC) representing gamma pulses.

56. A method of manufacturing a radiation detector, comprising:
manufacturing a plastic body and a lid by injection molding;
fusing a feedthrough insulator, with retained feedthrough electrode, and a pinch-off tube within said lid;
metalizing the entire inner surface of said plastic body and said lid, except contact surfaces between said body and lid, said feedthrough insulator and said pinch-off tube;
laminating over the metalization with 6Li foil;
joining said lid to said plastic body and sealing the surfaces;
evacuating the entire volume of the detector chamber retained within said plastic body covered by said lid;
filling said entire volume with working gas;
sealing said entire volume to prevent loss of working gas;
connecting exterior chamber metalization to ground potential; and
connecting said feedthrough electrode to electronics circuitry for registering gamma and neutron activity.

57. A detector for detecting neutrons and gamma radiation, comprising:
at least one cathode;
wherein the cathode defines an interior surface and an interior volume;
a plastic housing surrounding the cathode;
at least one plastic lid attached to the housing;
wherein the lid encloses the interior volume of the cathode;
at least one anode extending from the lid into the interior volume of the cathode;
at least one working gas disposed within the interior volume of said cathode;
at least one conductive neutron-capturing layer at least partially disposed on the interior surface of the cathode; and
an electrostatic shield layer at least partially covering the housing.

58. A detector for detecting neutrons and gamma radiation, comprising:
at least one cathode;
wherein the cathode defines an interior surface and an interior volume;
a plastic housing surrounding the cathode;
at least one plastic lid attached to the housing;
wherein the lid encloses the interior volume of the cathode;
at least one anode extending from the lid into the interior volume of the cathode;
at least one working gas disposed within the interior volume of said cathode;
at least one conductive neutron-capturing layer at least partially disposed on the interior surface of the cathode; and
an electrostatic shield layer at least partially covering said lid.

59. A detector for detecting neutrons and gamma radiation, comprising:
at least one cathode;
wherein the cathode defines an interior surface and an interior volume;
a plastic housing surrounding the cathode;
at least one plastic lid attached to the housing;
wherein the lid encloses the interior volume of the cathode;
at least one anode extending from the lid into the interior volume of the cathode;
at least one working gas disposed within the interior volume of said cathode; and
at least one conductive neutron-capturing layer at least partially disposed on the interior surface of the cathode;
wherein said anode is affixed to a hermetically sealed feed-through insulator that extends from said lid into the interior volume.

60. A detector as in claim 59, wherein said anode is disposed near the center of the interior volume.

61. A detector for detecting neutrons and gamma radiation, comprising:
at least one cathode;
wherein said cathode defines an interior surface and an interior volume;
at least one anode extending into the interior volume of said cathode;
at least one working gas disposed within the interior volume of said cathode;
at least one conductive neutron-capturing layer at least partially disposed on the interior surface of said cathode;
at least one high voltage bias source electrically connected to said cathode;
processing electronics electrically connected to said anode, the processing electronics including logic for separately registering neutron pulses and gamma pulses;
a plastic housing surrounding said cathode;
at least one plastic lid attached to said plastic housing;
wherein said lid encloses the interior volume of said cathode;
wherein said anode extends from said plastic lid into the interior volume of said cathode; and
an electrostatic shield layer at least partially covering said plastic housing.

62. A detector for detecting neutrons and gamma radiation, comprising:
at least one cathode;
wherein said cathode defines an interior surface and an interior volume;
at least one anode extending into the interior volume of said cathode;

at least one working gas disposed within the interior volume of said cathode;

at least one conductive neutron-capturing layer at least partially disposed on the interior surface of said cathode;

at least one high voltage bias source electrically connected to said cathode;

processing electronics electrically connected to said anode, the processing electronics including logic for separately registering neutron pulses and gamma pulses;

a plastic housing surrounding said cathode;

at least one plastic lid attached to said plastic housing;

wherein said lid encloses the interior volume of said cathode;

wherein said anode extends from said plastic lid into the interior volume of said cathode; and an electrostatic shield layer at least partially covering said lid.

63. A detector for detecting neutrons and gamma radiation, comprising:

at least one cathode;

wherein said cathode defines an interior surface and an interior volume;

at least one anode extending into the interior volume of said cathode;

at least one working gas disposed within the interior volume of said cathode;

at least one conductive neutron-capturing layer at least partially disposed on the interior surface of said cathode;

at least one high voltage bias source electrically connected to said cathode;

processing electronics electrically connected to said anode, the processing electronics including logic for separately registering neutron pulses and gamma pulses;

a plastic housing surrounding said cathode;

at least one plastic lid attached to said plastic housing;

wherein said lid encloses the interior volume of said cathode;

wherein said anode extends from said plastic lid into the interior volume of said cathode; and wherein said anode is affixed to a hermetically sealed feed-through insulator that extends from said lid into said interior volume.

64. A detector as in claim 63, wherein said anode is disposed near the center of the interior volume of said cathode.

* * * * *